United States Patent
Liu et al.

(10) Patent No.: US 10,927,248 B2
(45) Date of Patent: Feb. 23, 2021

(54) SULFONATED MODIFIERS FOR FROTH FLOTATION

(71) Applicant: Ecolab USA Inc., St. Paul, MN (US)

(72) Inventors: Jianjun Liu, Aurora, IL (US); Kevin O'Brien, Saint Charles, IL (US); Paul Wiatr, Roselle, IL (US); Daniel N.T. Hay, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 327 days.

(21) Appl. No.: 15/686,732

(22) Filed: Aug. 25, 2017

(65) Prior Publication Data

US 2018/0057680 A1 Mar. 1, 2018

Related U.S. Application Data

(60) Provisional application No. 62/380,143, filed on Aug. 26, 2016.

(51) Int. Cl.
*B03D 1/016* (2006.01)
*C08L 35/00* (2006.01)
(Continued)

(52) U.S. Cl.
CPC .............. *C08L 35/00* (2013.01); *B03D 1/012* (2013.01); *B03D 1/016* (2013.01); *B03D 1/021* (2013.01);
(Continued)

(58) Field of Classification Search
CPC .......... B03D 1/02; B03D 1/021; B03D 1/016; B03D 2201/02; B03D 2203/06;
(Continued)

(56) References Cited

U.S. PATENT DOCUMENTS

| 1,926,442 A | 9/1933 | Gunther et al. |
| 2,069,182 A | 1/1937 | Hagood |

(Continued)

FOREIGN PATENT DOCUMENTS

| CA | 2205886 A1 | 12/1997 |
| CN | 101020159 A | 8/2007 |

(Continued)

OTHER PUBLICATIONS

Shouci Lu et al., "Developments of Phosphate Flotation Reagents in China", Society for Mining, Metallurgy, and Exploration, (1999), pp. 21-26.

(Continued)

*Primary Examiner* — Thomas M Lithgow
(74) *Attorney, Agent, or Firm* — Kagan Binder, PLLC

(57) ABSTRACT

Improved sparge compositions for reverse froth flotation separation and uses thereof, and methods of reverse froth flotation are described. The sparge compositions comprise sulfonated polymeric modifiers which can act as dispersants and depressants, and the compositions are suitably used in the reverse froth flotation of particulate material containing ultrafine particles. For example, the compositions and methods can be used in the separation of phosphate beneficiary from ores comprising phosphates, dolomite, calcite, clay, silica, silicates, carbonates, and mixtures thereof.

10 Claims, 5 Drawing Sheets

(51) Int. Cl.
  *B03D 1/02* (2006.01)
  *B03D 1/012* (2006.01)
  *C01B 25/10* (2006.01)
  *C08L 33/02* (2006.01)
  *C08L 33/12* (2006.01)
  *C08L 33/26* (2006.01)
  *C01G 49/08* (2006.01)
  *B03D 1/008* (2006.01)

(52) U.S. Cl.
  CPC .............. *C01B 25/10* (2013.01); *C01G 49/08* (2013.01); *C08L 33/02* (2013.01); *C08L 33/12* (2013.01); *C08L 33/26* (2013.01); *B03D 1/008* (2013.01); *B03D 2201/007* (2013.01); *B03D 2201/02* (2013.01); *B03D 2203/02* (2013.01); *B03D 2203/06* (2013.01); *C08L 2201/54* (2013.01)

(58) Field of Classification Search
  CPC .............. B03D 1/008; B03D 2201/007; B03D 2203/02; C08L 35/00; C08L 33/02; C08L 33/12; C08L 33/26; C08L 2201/54; C01G 49/08
  USPC ................................................ 209/166, 167
  See application file for complete search history.

(56) References Cited

U.S. PATENT DOCUMENTS

| | | | |
|---|---|---|---|
| 2,126,292 A * | 8/1938 | Tartaron | B03D 1/006 209/166 |
| 2,740,522 A | 4/1956 | Aimone et al. | |
| 3,164,549 A | 1/1965 | Seymour | |
| 4,147,644 A | 4/1979 | Wang et al. | |
| 4,172,029 A | 10/1979 | Hefner, Jr. | |
| 4,287,053 A | 9/1981 | Lehr et al. | |
| 4,289,613 A | 9/1981 | Goodman et al. | |
| 4,360,425 A | 11/1982 | Lim et al. | |
| 4,364,824 A | 12/1982 | Snow | |
| 4,368,116 A | 1/1983 | Petrovich | |
| 4,372,843 A | 2/1983 | Lawver et al. | |
| 4,421,641 A | 12/1983 | Blazy et al. | |
| 4,436,616 A | 3/1984 | Defour et al. | |
| 4,486,301 A | 12/1984 | Hsieh et al. | |
| 4,514,292 A | 4/1985 | Burdick | |
| 4,552,652 A | 11/1985 | Attia et al. | |
| 4,565,625 A | 1/1986 | Hsieh et al. | |
| 4,568,454 A | 2/1986 | Mehrotra et al. | |
| 4,588,498 A | 5/1986 | Mair et al. | |
| 4,600,505 A | 7/1986 | Mair et al. | |
| 4,636,303 A | 1/1987 | Hsieh | |
| 4,719,009 A | 1/1988 | Furey et al. | |
| 4,720,339 A | 1/1988 | Nagaraj et al. | |
| 5,171,427 A | 12/1992 | Klimpel et al. | |
| 5,314,073 A | 5/1994 | Sharma et al. | |
| 5,507,395 A | 4/1996 | Wang et al. | |
| 5,525,212 A | 6/1996 | Nagari et al. | |
| 5,531,330 A | 7/1996 | Nagaraj et al. | |
| 5,533,626 A | 7/1996 | Nagaraj et al. | |
| 5,551,640 A | 9/1996 | Rajchel | |
| 5,919,975 A | 7/1999 | Rasheed | |
| 5,929,408 A | 7/1999 | Gutierrez et al. | |
| 6,076,682 A | 6/2000 | Gustafsson et al. | |
| 6,133,474 A | 10/2000 | Rasheed et al. | |
| 6,149,013 A | 11/2000 | Hughes | |
| 6,536,595 B2 | 3/2003 | Kowalski et al. | |
| 7,560,578 B2 | 7/2009 | Ahmad et al. | |
| 7,922,788 B2 | 4/2011 | Hillier et al. | |
| 8,221,709 B2 | 7/2012 | Gargulak et al. | |
| 8,720,694 B2 | 5/2014 | Nagaraj et al. | |
| 2006/0183879 A1 | 8/2006 | Yamato et al. | |
| 2010/0331484 A1 | 12/2010 | Swift et al. | |
| 2014/0144815 A1 | 5/2014 | Liu et al. | |
| 2014/0298872 A1 | 10/2014 | Gill et al. | |
| 2015/0196926 A1 | 7/2015 | Moreire Da Costa et al. | |
| 2016/0038948 A1 * | 2/2016 | Moore | C08F 220/28 209/163 |

FOREIGN PATENT DOCUMENTS

| | | |
|---|---|---|
| CN | 104107762 A | 10/2014 |
| CN | 104226488 A | 12/2014 |
| CN | 106269277 A | 1/2017 |
| GB | 498450 A | 1/1939 |
| SU | 1514409 | 10/1989 |
| WO | 2002089991 A2 | 11/2002 |
| WO | 2008/077849 A1 | 7/2008 |
| WO | 2014/066237 A1 | 5/2014 |
| WO | 2016109254 A1 | 7/2016 |
| ZA | 199601987 | 3/1996 |

OTHER PUBLICATIONS

Zhang et al., "Evaluation of phosphate depressants in the phosphate/dolomite system", 27th International Mineral Processing Congress, Industrial and Phosphate Research Institute, US (2014) pp. 1-10.
H. Sis et al., "Reagents used in the flotation of phosphate ores: a critical review," Minerals Engineering, vol. 16, No. 7, (2003), pp. 577-585.
Nagaraj et al., "Froth Flotation—A Century of Innovation", Society of Mining Metallurgy and Exploration, Inc., (2007), pp. 394-405.
Written Opinion and International Search Report for International Application No. PCT/US2017/048632 dated Nov. 30, 2017, 12 pages.
Provisional Opinion and Partial International Search Report, Annex to Invitation to Pay Additional Fees (Form PCTISA/206) for International Application No. PCT/US2017/048639 dated Dec. 21, 2017, 21 pages.
Turrer et al., "Investigation on alternative depressants for iron ore flotation", Minerals Engineering, 23. (2003), pp. 1066-1069.
Kellogg et al., "Flotation of Kaolinite for Removal of Quartz", Ceramic Age, 46(1), Jun. 30, 1945, pp. 1-8.
Papini et al., Cationic flotation of iron ores: amine characterization and performance, Minerals and Metallurgical Process, Society for Mining, Metallurgy and Exploration, 18(1), pp. 5-9.
Vijayaraghaven et al., "Beneficiation of Minerals in Reverse Flotation", Proceedings of National Seminar on Recent Techniques in Mineral Waste, Feb. 2, 2002, p. 82.
Srdjan M. Bulatovic, Handbook of Flotation Reagents, "Collectors", vol. 1, Chapter 2, 37 pages.
Standard Test Method for Sieve Analysis of Fine and Coarse Aggregates, ASTM International, Designation: C 136-05, pp. 88-92.
Norman C. Foster, "Sulfonation and Sulfation Processes", The Chemithon Corporation, 36 pages, Jan. 1, 1997.
International Search Report for International Application No. PCT/US2017/048639, dated Feb. 16, 2018, 10 pages.
Written Opinion for International Application No. PCT/US2017/048639, dated Feb. 16, 2018, 14 pages.
William W. Christie, Fatty Acids: Hydroxy and Other Oxygenated Structures, Occurrence and Biochemistry, updated Oct. 29, 2013 via lipidlibrary.aocs.org, 8 pages.
AUROPOL 438, Revision 3, Victorian Chemical Company Pty. Limited, Dated: May 20, 2009, 2 pages.
Araujo et al., Biodegradation studies on fatty amines used for reverse flotation of iron ore, International Biodeterioration & Biodegradation 64(2), Mar. 2010, pp. 151-155.
Clariant Mining "Iron Ore" brochure, Clariant Mining, The Woodlands, TX, 2012, pp. 1-4.
Sresty et al., Selective Flocculation of Synthetic Mineral Mixtures Using Modified Polymers, International Journal of Mineral Processing, vol. 6, Issue 4, Feb. 1980, pp. 303-320.
Turrer et al., Investigation on alternative depressants for iron ore flotation, Mineral Engineering, vol. 23, Oct. 2010, pp. 1066-1069.

(56) References Cited

OTHER PUBLICATIONS

Office Action from Chinese Application No. 201780048715.6, dated Aug. 28, 2020, 20 pages (12 pages English Translation & 8 pages Official Copy).

* cited by examiner

SULFONATED MODIFIERS FOR FROTH FLOTATION

The present invention relates to improved methods, modifiers, and compositions for froth flotation, in particular for separation of beneficiaries from mineral ores that require fine comminution.

BACKGROUND

The invention relates to novel materials, compositions, and methods for improving the effectiveness of froth flotation beneficiation processes. In a beneficiation process, two or more materials which coexist in a mixture of particulate material are separated from each other using mechanical processes with/without chemicals. Often one of the materials, the beneficiary, is more valuable or desired than the other material, the gangue.

One form of beneficiation is froth flotation separation. In froth flotation separation, to make a slurry a particulate material comprising an ore, such as ground or comminuted ore is slurried with water (or another solvent or solvent mix) along with chemicals such as collectors, modifiers, depressants and/or activators that assist in the separation of beneficiary from gangue. The role of the collector is to make targeted particles more hydrophobic, thereby assisting in their flotation from the slurry. The slurry is then doped with a frothing agent (frother) if necessary and sparged to form bubbles, which rise up out of the slurry carrying hydrophobic particles therewith and form a froth layer above the sparged slurry. The froth layer may then be deposited on a launder. The less hydrophobic material remains behind in the slurry, thereby accomplishing the froth flotation separation.

Two common forms of flotation separation processes are direct flotation and reverse flotation. In direct flotation processes, the froth comprises the beneficiary or concentrate while in reverse flotation processes, the froth comprises gangue or tailings. The object of the flotation in either process is to separate and recover as much as possible of the beneficiary from the particulate material in as high a concentration as possible, which is then made available for further downstream processing steps. In froth flotation, a sparge composition comprising a slurry is sparged to form a froth layer and a sparged slurry. In a direct froth flotation, the froth layer comprises a concentrated beneficiary (a concentrate), and the sparged slurry comprises tailings (concentrated gangue). In reverse froth flotation, the froth layer comprises tailings and the sparged slurry comprises the concentrated beneficiary. In direct froth flotation, the froth comprises more beneficiary as a proportion of beneficiary plus gangue than beneficiary as a proportion of beneficiary plus gangue in the sparge composition prior to sparging; and the tailings comprise more gangue as a proportion of beneficiary plus gangue than gangue as a proportion of beneficiary plus gangue in the sparge composition prior to sparging. In reverse froth flotation, the froth comprises more gangue as a proportion of beneficiary plus gangue than gangue as a proportion of beneficiary plus gangue in the sparge composition prior to sparging; and the tailings therefore comprise more gangue as a proportion of beneficiary plus gangue than gangue as a proportion of beneficiary plus gangue in the sparge composition prior to sparging.

Froth flotation separation can be used to separate solids from solids (such as the constituents of mine ore), and liquids or semi-solids from solids (such as the separation of bitumen from oil sands).

Depressants are commonly used to assist collectors in the froth flotation separation of mineral ores. Depressants hinder the flotation of either tailings (in direct froth flotation) or beneficiary (in reverse flotation).

Sulfonate moieties have been used as depressants for gangue such as siliceous materials in the flotation of beneficiary such as phosphate in direct froth flotation.

U.S. Pat. No. 4,172,029 discloses a process for beneficiation of a siliceous phosphate ore by froth flotation with fatty acid and fuel oil reagents and conditioning the phosphate ore with an alkyl-substituted aromatic sulfonate before floating the phosphate ore.

U.S. Pat. No. 4,514,292 discloses gangue depressants that consist essentially of the combination of an inorganic sulfite and salts of certain sulfonated compounds for metallic ore and coal. The salts disclosed include the salts of benzene disulfonic acids, naphthalene disulfonic acids, condensates of formaldehyde and naphthalene sulfonic acids, naphthol sulfonic acids, lignin sulfonic acids, and sulfonated quebracho.

U.S. Pat. No. 4,719,009 discloses polyester materials containing ether groups and metal sulfonate groups useful as depressants for siliceous gangue in the froth flotation separation of zinc sulfide concentrates from complex ores.

U.S. Pat. No. 5,314,073 discloses a process for beneficiation of siliceous phosphate ore by conditioning an aqueous slurry of the ore at a pH of 7.5 to 10.5 with a fatty acid and a fuel oil and a water-dispersible sulfo-polyester, and aerating the conditioned phosphate slurry to float the phosphate.

U.S. Pat. No. 5,507,395 discloses a method of depression of siliceous gangue, wherein the depressant is a graft polymer of polyvinyl alcohol and an acrylamide. The depressants may include comonomers such as vinyl sulfonate, 2-acrylamido-2-methyl propane sulfonic acid, styrene sulfonic acid, and 2-sulfoethylmethacrylate.

U.S. Pat. No. 5,525,212 discloses a method for the depression of non-sulfide silicate gangue materials, wherein the depressant is a mixture of polysaccharide and a graft polymer of polyvinyl alcohol and an acrylamide. The acrylamide may include a comonomers such as vinyl sulfonate, 2-acrylamido-2-methyl propane sulfonic acid, styrene sulfonic acid, and 2-sulfoethylmethacrylate.

U.S. Pat. No. 5,531,330 discloses a method of depression of non-sulfide, silicate gangue. The depressant is a polymeric material comprising the polymerization residue of acrylamide residue(s), a hydroxyl containing polymer unit, and an anionic group containing polymer unit. The anionic group containing polymer unit may comprise the polymerization residue of vinyl sulfonate, 2-acrylamido-2-methyl propane sulfonic acid, styrene sulfonic acid, and 2-sulfoethylmethacrylate, inter alia.

U.S. Pat. No. 5,533,626 discloses a method of depression of non-sulfide silicate gangue, wherein the depressant is a mixture of a polysaccharide and a polymeric material comprising the polymerization residue of acrylamide residue(s), a hydroxyl containing polymer unit, and an anionic group containing polymer unit. The anionic group containing polymer unit may comprise the polymerization residue of vinyl sulfonate, 2-acrylamido-2-methyl propane sulfonic acid, styrene sulfonic acid, and 2-sulfoethylmethacrylate, inter alia.

Further, sulfonate moieties have been used as collectors. For example, U.S. Pat. No. 3,164,549 discloses recovery of phosphate fraction from phosphate ore by employing fuel oil and sulfonic acid or it salt. U.S. Pat. No. 5,171,427 discloses dialkylated aryl sulfonic acids or salts thereof or their mixture used as collectors in the flotation of minerals, particularly oxide minerals.

From the foregoing, it will be seen that sulfonate moieties have been used as depressants for gangue minerals, especially for siliceous gangue and in processes in which beneficiary such as phosphate is floated.

The prerequisite for flotation separation is the liberation of particles. For flotation of mineral ores, therefore, comminuting (grinding the solids up by such techniques as dry-grinding, wet-grinding, and the like) is required to liberate minerals. Extensive grinding or comminution can result in better liberation of particles for the separation of beneficiary and gangue in a froth flotation process. However, such grinding or comminution can result in a relatively large proportion of ultrafine particles (less than 10 µm). The presence of ultrafine particles represents a challenge for froth flotation such as slime coating, which can lead to lower recovery of beneficiary. In slime coating, particles of ultrafines coat larger particles of ore. This issue is especially serious for the flotation of non-sulfide mineral ores such as industrial mineral ores, phosphate ores, potash ores, and metallic oxide ores: Ultrafine particles of gangue or gangue-rich material may coat particles of beneficiary or beneficiary-rich material—in such a case, beneficiary-rich material may be separated with the gangue in a froth flotation process. Such an eventuality can undesirably result in lower recovery of the beneficiary. Similarly, for example, ultrafines of beneficiary may coat particles of gangue—the particles of gangue may thus be separated with beneficiary. Such an eventuality can undesirably result in a lower purity of beneficiary. In order to avoid such problems, desliming processes are commonly implemented before and in preparation for froth flotation, to remove ultrafine particles. However, ultrafines often nevertheless enter the froth flotation process and cause slime coating and other issues that have deleterious effects on separation of beneficiary and gangue. Therefore dispersants are often employed in froth flotation processes to mitigate the detrimental effect of ultrafines in froth flotation by dispersing ultrafines of beneficiary and gangue and/or reducing the availability of ultrafines to coat the larger particles in desliming processes and/or conditioning processes or otherwise mitigate loss of beneficiary and/or reduction of the purity of beneficiary.

In view of the above issues, it would be an advantage to provide for froth flotation improved methods and/or compositions that can be implemented in existing froth flotation installations for separation of beneficiary from ores. It would be an advantage to provide improved methods and/or compositions that can be used effectively to concentrate beneficiaries from materials that contain ultrafine particles. It would be an advantage to provide one or more dispersants to effectively disperse both beneficiary and gangue particles in the grinding process, desliming processes, conditioning processes, or any combination thereof of ores and/or slurries of comminuted ores for froth flotation separation.

SUMMARY

Disclosed herein is a sparge composition comprising, consisting of, or consisting essentially of (i) a medium; (ii) a phosphate ore comprising a phosphate beneficiary and a gangue; (iii) a collector; and (iv) a modifier comprising one or more sulfonated polymers. In embodiments, the gangue comprises, consists of, or consists essentially of silica, a silicate, carbonate, or any combination thereof. In embodiments, the medium comprises, consists of, or consists essentially of water. In embodiments, the phosphate beneficiary comprises an apatite. In some such embodiments, the apatite comprises, consists of, or consists essentially of francolite. In embodiments the collector comprises, consists of, or consists essentially of a sulfonated fatty acid. In embodiments, the sulfonated fatty acid is selected from sulfonated oleic acid, sulfonated linoleic acid, sulfonated palmitic acid, sulfonated stearic acid, and any combination thereof. In some such embodiments, the collector comprises, consists of, or consists essentially of a sulfonated oleic acid. In embodiments, the sparge composition has a pH of 4 to 7. In embodiments, the sparge composition further comprises phosphoric acid. In embodiments, the sparge composition further comprises a pH adjustment agent. In some such embodiments, the pH adjustment agent comprises, consists of, or consists essentially of sulfuric acid. In embodiments, the modifier has a weight average molecular weight of from about 300 g/mole to about 100,000 g/mole. In some such embodiments, the modifier comprises, consists of, or consists essentially of a polymer comprising a first residue of acrylic acid and/or a salt thereof, and a further residue of 2-acrylamido-2-methylpropane sulfonic acid or a salt thereof (ATBS), sulfomethylated acrylamide, or a further residue of both ATBS and sulfomethylated acrylamide.

Also disclosed herein is a method of froth flotation, the method comprising, consisting of, or consisting essentially of forming a sparge composition, the sparge composition comprising, consisting of, or consisting essentially of (i) a medium, (ii) a phosphate ore, the phosphate ore comprising a phosphate beneficiary and a gangue, (iii) a collector, and (iv) a modifier comprising one or more sulfonated polymers; and sparging the sparge composition to yield a sparged composition comprising a froth and a sparged slurry, the sparged slurry comprising a concentrate of the phosphate beneficiary, and the froth comprising tailings of the gangue. In embodiments, the gangue comprises, consists of, or consists essentially of a silicate, silica, carbonate, or any combination thereof. In embodiments, the medium comprises, consists of, or consists essentially of water. In embodiments, the collector comprises, consists of, or consists essentially of a sulfonated fatty acid. In some such embodiments, the sulfonated fatty acid comprises, consists of, or consists essentially of sulfonated oleic acid. In embodiments, the sparge composition comprises phosphoric acid, sulfuric acid, or a combination thereof. In embodiments, the modifier comprises, consists of, or consists essentially of a sulfonated natural polymer, a sulfonated synthetic polymer, or a combination thereof. In some such embodiments, the modifier comprises, consists of, or consists essentially of a sulfonated synthetic polymer having a weight average molecular weight of from about 300 g/mole to about 100,000 g/mole. In some such embodiments, the sulfonated synthetic polymer comprises the residue of sulfonated vinyl alcohol, sulfonated acrylamide, sulfomethylated acrylamide, 2-acrylamido-2-methylpropane sulfonic acid and/or a salt thereof (ATBS), styrene sulfonic acid and/or a salt thereof, or any combination thereof. In some such embodiments, the sulfonated synthetic polymer further comprises the residue of acrylic acid and/or a salt thereof, methacrylic acid and/or a salt thereof, acrylamide, vinyl alcohol, maleic acid and/or a salt thereof, maleic acid esters, or any combination thereof. In some such embodiments, the sulfonated synthetic polymer comprises a first residue comprising a polymerized residue of acrylic acid and/or a salt thereof; and a second residue comprising a polymerized residue of ATBS, a sulfomethylated acrylamide, or a combination thereof. In some such embodiments, the sulfonated synthetic polymer has a weight average molecular weight of about 300 g/mole to about 100,000 g/mole. In embodiments, the method further includes separating at least a portion of the concentrate of the phosphate beneficiary from the sparged slurry.

DETAILED DESCRIPTION

Figure 1:
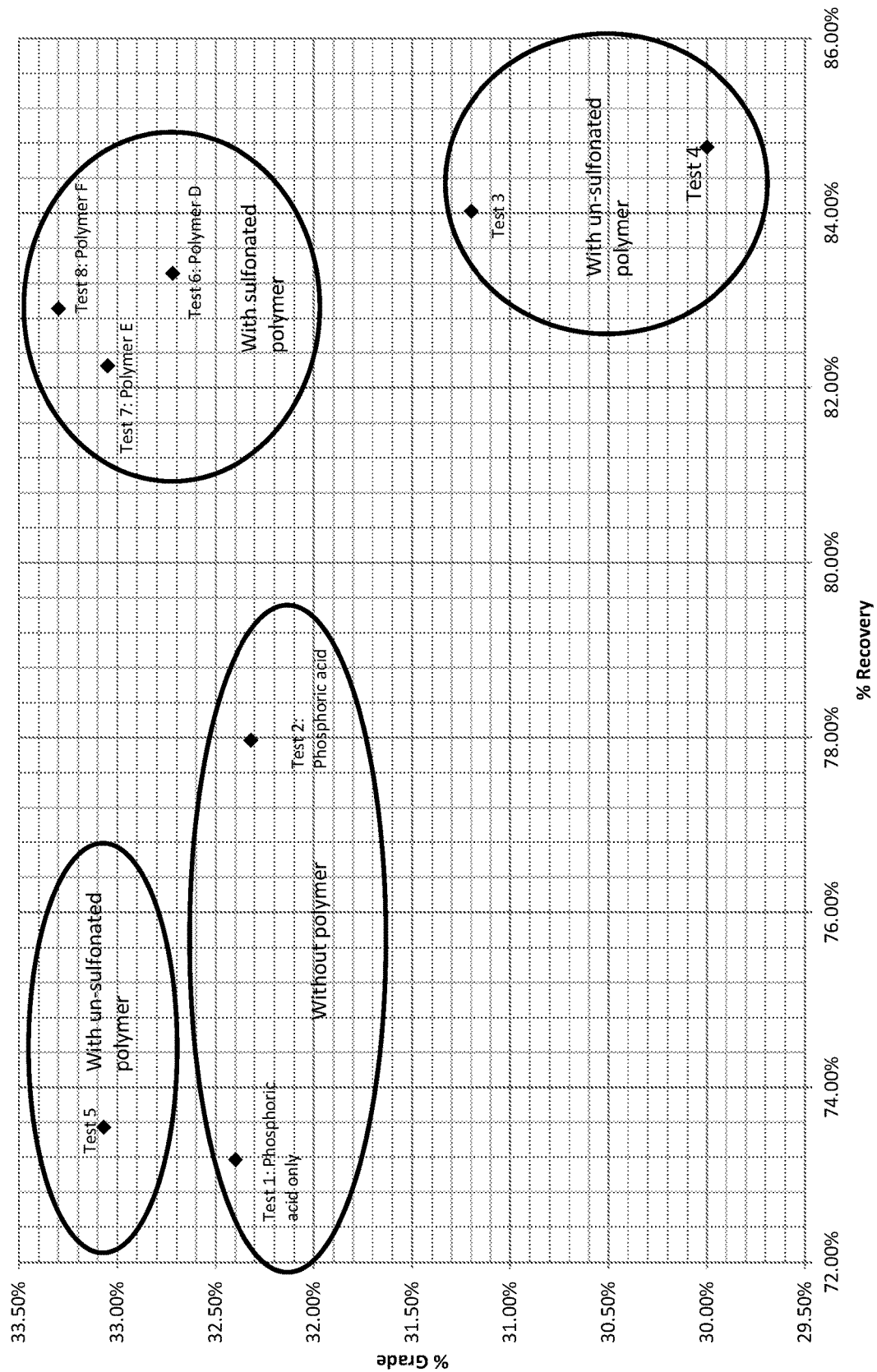
FIG. 1 shows a plot of the percentage grade of phosphate recovered versus % phosphate recovery for a variety of froth flotation tests with different depressants in tap water.

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control.

As used herein, the terms "comprise(s)," "include(s)," "having," "has," "can," "contain(s)," and variants thereof are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" or "about 1 to about 5", the recitation means "1 to 5" and "about 1 to about 5" and "1 to about 5" and "about 1 to 5" unless specifically limited by context.

As used herein, "ore" means any solid terranean material of economic value that is obtained by excavation such as quarrying, open-cast mining, or pit mining: "ore" is construed herein to include not only rock, minerals, and mineral aggregates containing one or more metals in elemental and/or chemically compounded forms, but also coal and other solid terranean substances.

As used herein, "carbonate" or "a carbonate", unless specified to the contrary, means inorganic carbonate such as material containing $CO_3^{2-}$, $HCO_3^-$ ions and counterions.

As used herein, "phosphate", unless specified to the contrary, refers to inorganic phosphate such as material containing $PO_4^{3-}$, $H_2PO_4^{2-}$, and $H_2PO_4^-$ ions and counterions.

As used herein, "medium" means a material that is liquid at 20° C. and 1 atmosphere pressure. In any of the embodiments herein, the medium can comprise, consist of, or consist essentially of water.

As used herein, "phosphoric acid" refers to orthophosphoric acid, commonly given the formula $H_3PO_4$.

As used herein, "phosphate ore" means an ore in the form of a particulate comprising inorganic phosphate.

As used herein, "particulate" or "particulate material" means a plurality of particles. As used herein, "particle" means a discreet, solid object to which can be ascribed physicochemical properties such as volume or mass, wherein a particle has a largest maximum dimension in any direction of about 0.001 μm to about 5 mm.

As used herein, "ultrafine particles" or "ultrafines" means particles having a particle size of less than 10 μm when measured according to throw-action sieve analysis carried out wet.

As used herein, "comminuted" means reduced in size. In embodiments, comminuted means powdered, pulverized, ground, or otherwise divided by mechanical means.

As used herein, "sparge composition" means a composition comprising a particulate material; a sulfonated polymer, and/or other collector; and a liquid medium. Such a composition has a liquid surface and comprises a slurry of the particulate material in the medium. Such a composition, after being sparged, comprises froth at the liquid surface and a sparged slurry. In direct froth flotation, the froth comprises a concentrate, and the sparged slurry comprises tailings. In reverse froth flotation, the froth comprises tailings and the sparged slurry comprises a concentrate. In embodiments, the collector is a sulfonated fatty acid.

As used herein, "concentrate" means a material in which a beneficiary has been concentrated by a froth flotation process. The concentrate has a higher concentration of the beneficiary (as a ratio by weight of beneficiary to beneficiary plus gangue) than the particulate material of the sparge composition before sparging.

As used herein, "tailings" means a material in which a gangue has been concentrated by a froth flotation process.

The tailings have a higher concentration of the gangue (as a ratio by weight of gangue to beneficiary plus gangue) than the particulate of the sparge composition before sparging.

As used herein, "sparged slurry" means the liquid body of a sparge composition that has been sparged, wherein a froth has formed at the air-liquid interface. As used herein, the sparged slurry excludes or substantially excludes froth.

As used herein "slurry of particles" means a composition comprising a liquid medium and particulate material, wherein the particulate material is dispersed and/or suspended in the medium, and wherein the composition excludes or substantially excludes a collector. In embodiments, the liquid medium consists essentially of water.

As used herein, "sparge", "sparged", or "sparging" refers to the introduction of a gas into a sparge composition for the purpose of creating a plurality of bubbles that migrate upwards within the liquid. In embodiments, the gas is air.

As used herein, a "collector" means a material that selectively adheres to targeted particles in a sparge composition, and increases adhesion or association of the targeted particles to bubbles of a gas during sparging. "Targeted particles" are gangue-rich particles (in reverse froth flotation) or beneficiary-rich particles (in direct froth flotation).

As used herein, a "depressant" means a material that selectively reduces the adhesion or association of untargeted particles in a sparge composition to bubbles of a gas during sparging. Untargeted particles are gangue-rich particles in direct froth flotation or beneficiary-rich particles in a reverse froth flotation. A depressant acts to decrease the migration of untargeted particles to the surface of a sparged composition.

As used herein, a "frother" or "frothing agent" means a composition of matter that reduces the surface tension of water and enables the formation of a froth at air-liquid interface of a sparge composition during sparging.

As used herein, "dispersant" means a material that disperses particles of an ore in a liquid medium such as water, assists in the dispersion of particles of an ore in the medium, stabilizes a dispersion of particles of an ore in the medium, or any combination thereof. In embodiments, a dispersant is a material that disperses ultrafine particles of the ore.

As used herein, a "modifier" means a material that is, acts as, or is effective as a dispersant, a depressant, or both a dispersant and depressant. In embodiments, the modifiers of the invention are, act as, or are effective as both dispersants and depressants.

As used herein, "ATBS" means 2-acrylamido-2-methylpropane sulfonic acid and/or salts thereof, except where otherwise specified as follows: as used herein, "ATBS sulfonic acid" means 2-acrylamido-2-methylpropane sulfonic acid; as used herein an "ATBS salt" means a salt of 2-acrylamido-2-methylpropane sulfonic acid.

As used herein, "flotation" of a material means a process in froth flotation in which during the aeration of a slurry of a comminuted ore in a liquid medium, the material migrates to the surface of the slurry and to a froth layer that forms on the surface of the slurry.

As used herein, "depression" of a material refers to a process in froth flotation in which during the sparging of a slurry of a comminuted ore in a liquid medium, the material remains substantially within the sparged slurry and does not tend to migrate into the froth layer.

As used herein, "sulfonated monomer" means a polymerizable compound comprising at least one sulfonate or sulfate group ($-SO_3H$, $-SO_3R$, $-SO_3^-$, $-O-SO_3H$, $-O-SO_3R$, or $-O-SO_3^-$, where R is alkyl, aryl, alkaryl, or another organic group).

As used herein, "sulfonated monomer residue" and like terms mean a polymerized residue of a monomer, wherein the residue comprises at least one sulfonate or sulfate moiety.

As used herein, "sulfonate moiety", "sulfonate", "sulfonate group", "sulfonated" and like terms means a moiety comprising at least one sulfonate or sulfate group ($-SO_3H$, $-SO_3R$, $-SO_3^-$, $-O-SO_3H$, $-O-SO_3R$, or $-O-SO_3^-$, where R is alkyl, aryl, alkaryl, or another organic group).

As used herein, the term "sulfonated fatty acid" means a compound that is a product of a sulfonating one or more fatty acids and/or a salt thereof. The sulfonated fatty acid has at least one $-COOH$ or $CO_2^-$, and at least one $-SO_3H$ or $SO_3^-$.

As used herein, "sulfonated polymer" means a polymer comprising at least one sulfonate or sulfate group ($-SO_3H$, $-SO_3R$, $-SO_3^-$, $-O-SO_3H$, $-O-SO_3R$, or $-O-SO_3^-$, where R is alkyl, aryl, alkaryl, or another organic group).

As used herein, "phosphate beneficiary" means a beneficiary comprising phosphate.

Discussion

Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

Applicants have found that sulfonated polymers having a weight average molecular weight of about 100,000 g/mole or less unexpectedly improve the floating of gangue minerals in the reverse flotation of mineral ores such as phosphate ores, and have found that sulfonated polymers act as dispersants for both beneficiary and gangue particles for mineral ores. Therefore, sulfonated polymers can be used as dispersants in both direct and reverse froth flotation and can be applied before flotation in a grinding process, a desliming process, a conditioning process, or any combination thereof. In embodiments, the sulfonated polymers decrease slime coating in the froth flotation.

The polymers comprise one or more sulfonate and/or sulfate groups. Disclosed are methods and compositions for froth flotation that include modifiers that comprise, consist of, or consist essentially of one or more sulfonated polymers. The modifiers, compositions comprising the modifiers, and methods can be implemented in existing froth flotation installations for separation of beneficiary and gangue of a comminuted ore. The comminuted ore comprises particles of ore. In embodiments, the particles of ore comprise, consist of, or consist essentially of ultrafine particles. Used in a reverse froth flotation process in a medium for the separation of beneficiary and gangue from a mineral ore, the modifiers of Applicant's invention unexpectedly provide improved separation and selectivity toward concentrate or tailings, improved recovery of beneficiary (as measured by weight of beneficiary recovered as a proportion of total beneficiary in the mineral ore), higher grade (as measured by weight of beneficiary in the concentrate), improved depressing action of depressant on the beneficiary (as measured by reduction of depressant dosage), improved dispersion of particles of ore, improved dispersion of ultrafines of ore, reduced slime coating of particles of ore, or any combination thereof.

First Embodiments

Therefore, in first embodiments, there is provided a sparge composition for froth flotation, the sparge composition comprising, consisting of, or consisting essentially of a medium, a mineral ore, a collector, and a modifier comprising one or more sulfonated polymers. In embodiments, the sparge composition for froth flotation is a sparge composition for reverse froth flotation. In embodiments, the medium comprises, consists of, or consists essentially of water. In embodiments, the medium is water. In embodiments, the mineral ore comprises, consists of, or consists essentially of a beneficiary and a gangue. In embodiments, the mineral ore comprises, consists of, or consists essentially of a phosphate ore, the phosphate ore comprising a phosphate beneficiary and a gangue. In embodiments, the gangue comprises, consists of, or consists essentially of a silicate, silica, carbonate, or any combination thereof. In embodiments, the gangue comprises calcite, dolomite, clay, or any combination thereof.

In embodiments the mineral ore comprises, consists of, or consists essentially of a fertilizer ore, an industrial mineral ore, a fuel mineral ore, or any combination thereof. In embodiments, the mineral ore comprises, consists of, or consists essentially of a fertilizer ore selected from phosphate ore, potash ore, and a combination thereof. In embodiments, the mineral ore comprises, consists of, or consists essentially of an industrial mineral ore selected from limestone, clay, sand, gravel, diatomite, kaolin, bentonite, silica, barite, gypsum, talc, zircon, fluorite, and any combination thereof. In embodiments, the mineral ore comprises, consists of, or consists essentially of a fuel mineral ore selected from coal, bituminous oil sands, and a combination thereof. In embodiments, the mineral ore comprises, consists of, or consists essentially of an apatite. In some such embodiments, the mineral ore comprises, consists of, or consists essentially of hydroxylapatite, fluorapatite, chlorapatite, or any combination thereof. In some embodiments, the mineral ore comprises, consists of, or consists essentially of francolite.

In embodiments, the mineral ore comprises phosphate ore and the gangue comprises calcite, dolomite, silica and/or silicate, or any combination thereof.

In embodiments, the mineral ore comprises francolite and the gangue comprises silica, silicate, carbonate, or any combination thereof.

In embodiments, the sparge composition further comprises phosphoric acid. In some such embodiments, the weight ratio of the phosphoric acid to the mineral ore is from about 0.5 kg to about 20 kg of phosphoric acid per ton of the particles of the mineral ore, in embodiments from about 0.5 kg to about 8 kg, in embodiments from about 1 kg to about 8 kg, in embodiments from about 1.5 kg to about 8 kg, in embodiments from about 1.5 kg to about 7 kg, in embodiments from about 1.5 kg to about 6 kg, in embodiments from about 1.5 kg to about 5 kg, in embodiments from about 1.5 kg to about 4 kg, or in embodiments from about 1.5 kg to about 3 kg of phosphoric acid per ton of mineral ore.

In embodiments the sparge composition further comprises a pH adjustment agent. In embodiments, the pH adjustment agent is an acid. In embodiments, the pH adjustment agent is a base. In embodiments, the acid is selected from hydrochloric acid, sulfuric acid, p-toluene sulfonic acid, and any combination thereof. In embodiments, the pH adjustment agent comprises, consists of, or consists essentially of sulfuric acid.

In embodiments, the sparge composition has a pH from 1-3, in embodiments 3-6, in embodiments 6-10, in embodiments 11-14, in embodiments 4.5 to 5.5, in embodiments, 4.7 to 5.3, in embodiments 5.0 to 5.2, or in embodiments 4-7.

In embodiments, the sparge composition further comprises a second collector. In some embodiments, the second collector comprises, consists of, or consists essentially of a functionalized silicone.

In embodiments, the sparge composition further comprises a second collector selected from those disclosed in pages 5-40 of Bulatovic, S.M. Ed., *Handbook of Flotation Reagents* Vol. 1. Elsevier. In some such embodiments, the second collector is selected from primary, secondary, and tertiary amines and/or their ammonium salts, ether amines, fatty amines, amine condensates, amphoteric amine carboxylic compounds, and any combination thereof.

In some embodiments, the collector is selected from sulfonated oleic acid, sulfonated linoleic acid, sulfonated palmitic acid, sulfonated stearic acid, and any combination thereof. In embodiments, the collector comprises, consists of, or consists essentially of sulfonated oleic acid.

In embodiments, the sparge composition comprises, consists of, or consists essentially of: water; a particulate comprising a phosphate ore, the phosphate ore comprising silica, a silicate, a carbonate, or any combination thereof; sulfonated oleic acid; a modifier comprising one or more sulfonated polymers; and phosphoric acid, wherein the pH of the sparge composition is from about 4 to about 7.

In embodiments, the one or more sulfonated polymers are selected from a sulfonated natural polymer, a sulfonated synthetic polymer, and a combination thereof.

In embodiments the weight average molecular weight of the sulfonated synthetic polymer is from about 300 to about 5,000,000, in embodiments about 300 to about 1,000,000, in embodiments about 300 to about 500,000, in embodiments about 300 to about 100,000, in embodiments about 300 to about 50,000, in embodiments about 300 to about 35,000, in embodiments about 300 to about 30,000, in embodiments about 300 to about 25,000, in embodiments from about 500 to about 5,000,000, in embodiments about 500 to about 1,000,000, in embodiments about 500 to about 500,000, in embodiments about 500 to about 100,000, in embodiments about 500 to about 50,000, in embodiments about 500 to about 25,000, in embodiments from about 700 to about 5,000,000, in embodiments about 700 to about 1,000,000, in embodiments about 700 to about 500,000, in embodiments about 700 to about 100,000, in embodiments about 700 to about 50,000, in embodiments about 700 to about 25,000, in embodiments from about 1,000 to about 5,000,000, in embodiments about 1,000 to about 1,000,000, in embodiments about 1,000 to about 500,000, in embodiments about 1,000 to about 100,000, in embodiments about 1,000 to about 50,000, in embodiments about 1,000 to about 40,000, in embodiments about 1,000 to about 35,000, in embodiments about 1,000 to about 30,000, in embodiments about 1,000 to about 25,000, in embodiments about 500 to about 20,000, in embodiments about 500 to about 15,000, in embodiments about 500 to about 10,000, in embodiments about 500 to about 7,000, in embodiments about 500 to about 5,000, in embodiments about 500 to about 3,000, in embodiments about 500 to about 1,000, in embodiments about 1,000 to about 25,000, in embodiments about 700 to about 20,000, in embodiments about 700 to about 15,000, in embodiments about 700 to about 10,000, in embodiments about 700 to about 7,000, in embodiments about 700 to about 5,000, in embodiments about 700 to about 3,000, in embodiments about 700 to about 1,000, in embodiments about 1,000 to about 25,000, in embodiments about 1,000 to about 20,000, in embodiments about 1,000 to about 15,000, in embodiments about 1,000 to about 10,000, in embodiments about 1,000 to about 7,000, in embodiments about 1,000 to about 5,000, in embodiments about 1,000 to about 3,000, or in embodiments about 1,000 to about 2,000.

In embodiments, the weight ratio of the one or more sulfonated polymers to the particulate comprising the mineral ore is from about 1 g to about 1000 g of the one or more sulfonated polymers per ton of the mineral ore, in embodiments from about 5 g to about 500 g, in embodiments, from about 10 g to about 500 g, in embodiments from about 20 g to about 300 g, in embodiments from about 50 g to about 300 g, in embodiments from about 50 g to about 200 g, in embodiments from about 10 g to about 100 g, in embodiments from about 10 g to about 70 g, in embodiments from about 30 g to about 70 g of the one or more sulfonated polymers per ton of ore.

In embodiments, 1% to 99% by weight of the particulate comprises particles having a particle size from about 38 microns to about 250 microns, in embodiments 50% to 80% by weight of the comminuted ore has a particle size from about 38 microns to about 250 microns, in embodiments 60% to about 70% has a particle size from about 38 microns to about 250 microns, in embodiments 65% to 75% has a particle size from about 38 microns to about 250 microns, or in embodiments about 68% to about 72% has a particle size from about 38 microns to about 250 microns as measured by throw-action sieve analysis carried out wet. The procedure for this test is outlined in American Society for Testing and Materials (ASTM) C 136[2].

Second Embodiments

In second embodiments, the modifier of the composition of the first embodiments comprises, consists of, or consists essentially of a sulfonated lignin. Lignin is a class of complex organic polymers. Without limitation thereto and solely for the purposes of illustration, lignin may be represented by the structure (I).

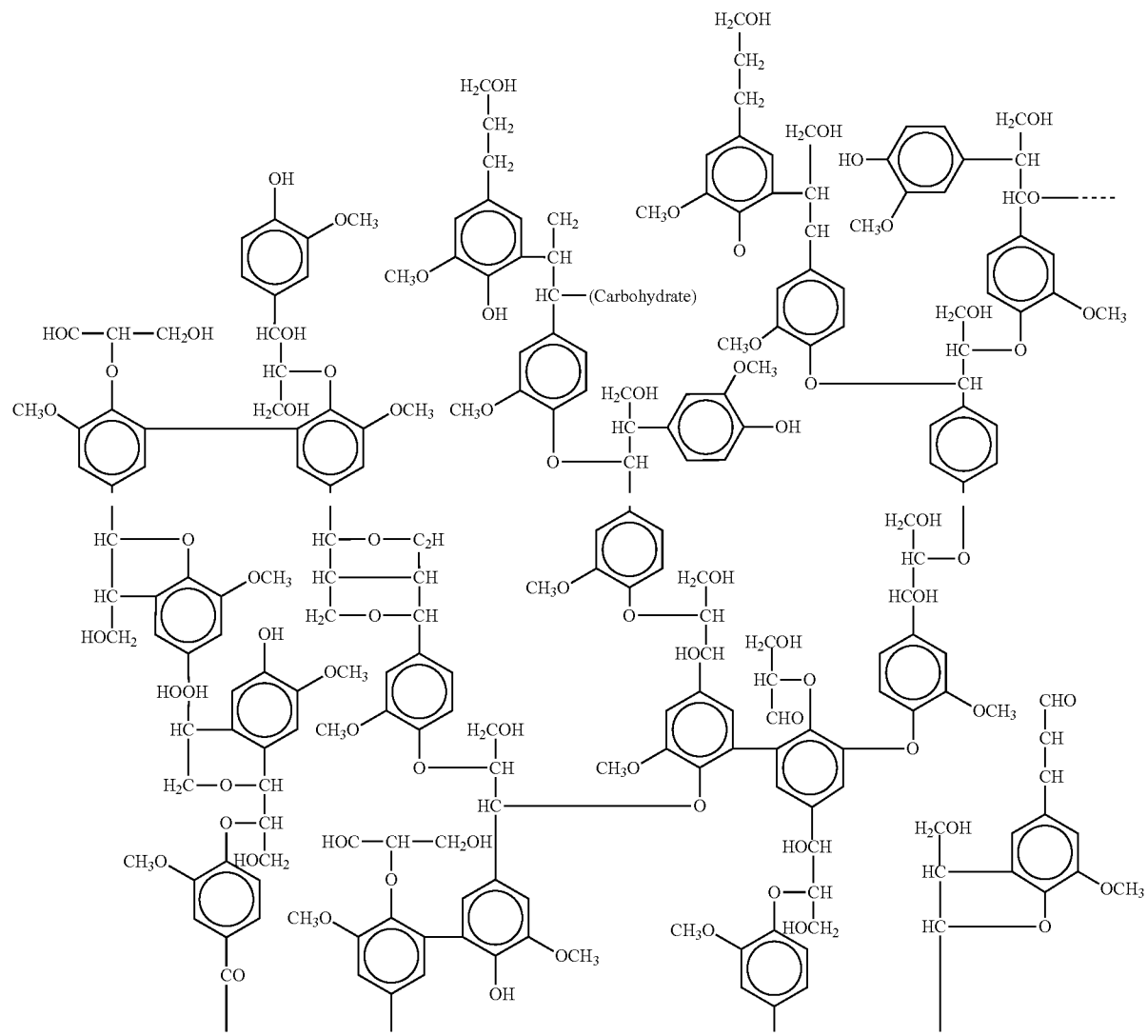

(I)

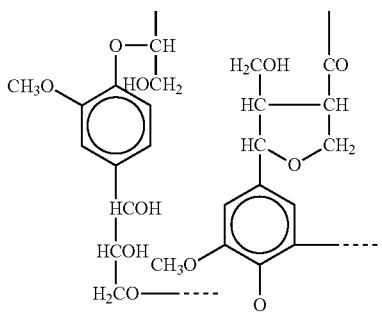
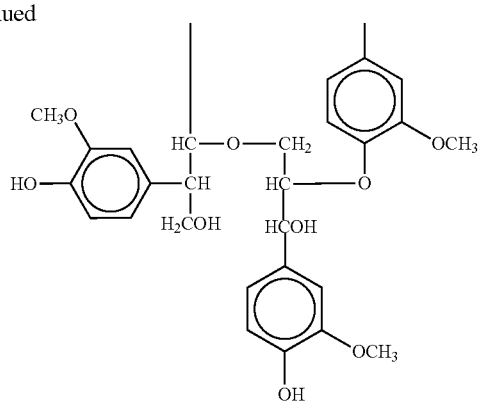

In embodiments, the sulfonated lignin has a weight average molecular weight range of from about 1,000 to about 140,000.

In embodiments, the sulfonated lignin comprises, consists of, or consists essentially of a byproduct of production of wood pulp using sulfite pumping. In some embodiments, the sulfonated lignin is the reaction product of lignin with one or more sulfites, one or more bisulfites, or a combination thereof.

In embodiments, the sulfonated lignin has comprises a modification of structure (I) wherein one or more of the —$CH_2OH$ groups is replaced with —$CH_2SO_3H$, —$CH_2SO_3^-$, or a combination thereof.

In embodiments, the sulfonated lignin has a structure comprising structure (II), structure (III), or both structure (II) and structure (III):

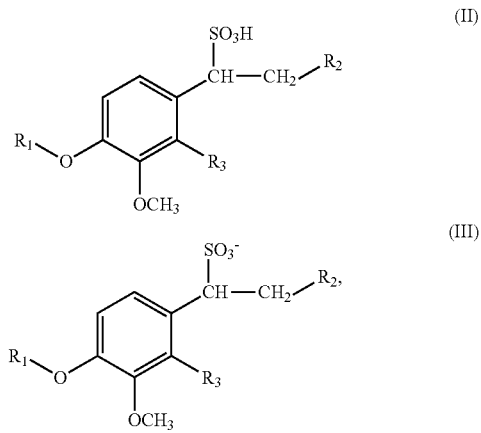

wherein $R_1$ is hydrogen or one of a wide variety of organic structures found in the structure of lignin; $R_2$ is one of a wide variety of organic structures found in the structure of lignin; and $R_3$ is hydrogen or one of a wide variety of organic structures found in the structure of lignin.

Third Embodiments

In third embodiments, the modifier of the composition of the first embodiments comprises, consists of, or consists essentially of a sulfonated starch. In embodiments, the sulfonated starch comprises amylopectin wherein one or more of the —OH groups is replaced with a sulfonate group (—$SO_3H$ and/or —$SO_3^-$), amylose wherein one or more of the —OH groups is replaced by a sulfonate group (—$SO_3H$ and/or —$SO_3^-$), or a combination thereof.

Fourth Embodiments

In fourth embodiments, the modifier of the composition of the first embodiments comprises, consists of, or consists essentially of a sulfonated cellulose, wherein one or more of the —OH groups in cellulose molecules is replaced by a sulfonate group (—$SO_3H$ and/or —$SO_3^-$).

Fifth Embodiments

In fifth embodiments, the modifier of the composition of the first embodiments comprises, consists of, or consists essentially of a sulfonated lignin, a sulfonated starch, a sulfonated cellulose, a sulfonated guar gum, a sulfonated xanthan gum, or any combination thereof.

Sixth Embodiments

In sixth embodiments, the modifier of the composition of any of the first embodiments comprises one or more sulfonated synthetic polymers. In sixth embodiments, the modifier of the sparge composition of any of the first embodiments comprises one or more sulfonated synthetic polymers, wherein at least one of the one or more sulfonated synthetic polymers comprises a residue of a sulfonated monomer, wherein the sulfonated monomer is selected from sulfonated vinyl alcohol, sulfonated acrylamide, sulfomethylated acrylamide, 2-acrylamido-2-methylpropane sulfonic acid and/or a salt thereof (ATBS), styrene sulfonic acid and/or a salt thereof, and any combination thereof.

In embodiments, the at least one of the one or more sulfonated synthetic polymers comprises a monomer residue having the structure (IV)

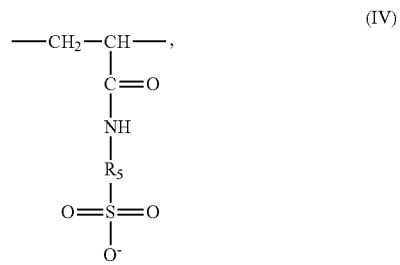

a monomer residue having the structure (V)

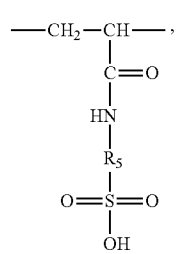

(V)

or a combination thereof, wherein $R_5$ is a divalent organic group. In embodiments, the divalent organic group is selected from alky, aryl, or alkaryl. In some such embodiments, $R_5$ is $(CH_2)n$ wherein n is 1-6. In some such embodiments, $R_5$ is $(CH_2)n$ wherein n is 1-3.

In embodiments, the at least one of the one or more sulfonated synthetic polymers comprises a monomer residue having the structure (VI)

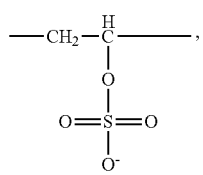

(VI)

wherein the counterion is selected from $NH_4^+$, $Na^+$, $K^+$, primary organic ammonium, secondary organic ammonium, tertiary organic ammonium, and quaternary organic ammonium;
the monomer residue having the structure (VII)

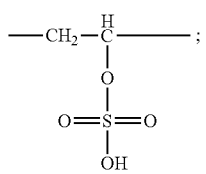

(VII)

the monomer residue having the structure (VIII)

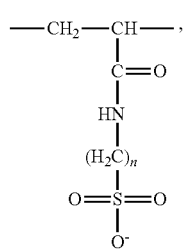

(VIII)

wherein n is 1, 2, or 3 and the counterion is selected from $NH_4^+$, $Na^+$, $K^+$, primary organic ammonium, secondary organic ammonium, tertiary organic ammonium, and quaternary organic ammonium; the monomer residue having the structure (IX)

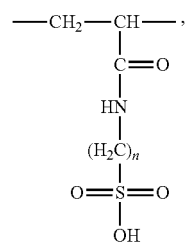

(IX)

wherein n is 1, 2, or 3;
the monomer residue having the structure (X)

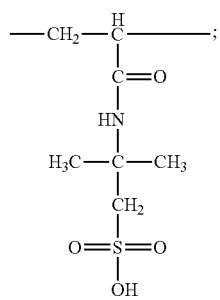

(X)

the monomer residue having the structure (XI)

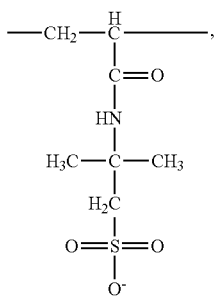

(XI)

wherein the counterion is selected from $NH_4^+$, $Na^+$, $K^+$, primary organic ammonium, secondary organic ammonium, tertiary organic ammonium, and quaternary organic ammonium; the monomer residue having the structure (XII)

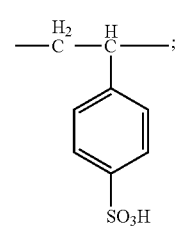

(XII)

the monomer residue having the structure (XIII)

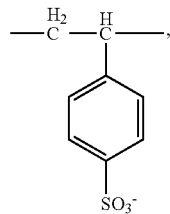

(XIII)

wherein the counterion is selected from $NH_4^+$, $Na^+$, $K^+$, primary organic ammonium, secondary organic ammonium, tertiary organic ammonium, and quaternary organic ammonium;
the monomer residue having the structure (XIV)

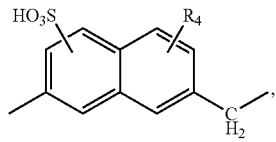

(XIV)

wherein $R_4$ is alkyl;
the monomer residue having the structure (XV)

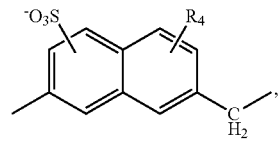

(XV)

wherein $R_4$ is alkyl and wherein the sulfonate counterion is selected from $NH_4^+$, $Na^+$, $K^+$, primary organic ammonium, secondary organic ammonium, tertiary organic ammonium, and quaternary organic ammonium; the monomer residue having the structure (XVI)

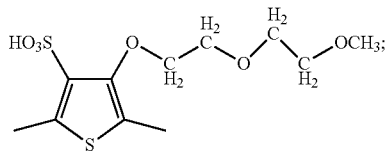

(XVI)

the monomer residue having the structure (XVII)

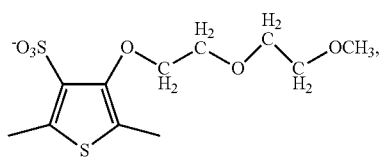

(XVII)

wherein the sulfonate counterion is selected from $NH_4^+$, $Na^+$, $K^+$, primary organic ammonium, secondary organic ammonium, tertiary organic ammonium, and quaternary organic ammonium; or any combination thereof.

In some such embodiments, the at least one of the one or more sulfonated synthetic polymers further comprises the residue of acrylamide, the residue of acrylic acid, the residue of an acrylic acid salt, the residue of methacrylic acid, the residue of a methacrylic acid salt, the residue of maleic acid, the residue of a salt of maleic acid, the residue of a monoester of maleic acid, the residue of salt of a monoester of maleic acid, the residue of a diester of maleic acid, the residue having the structure (XVIII)

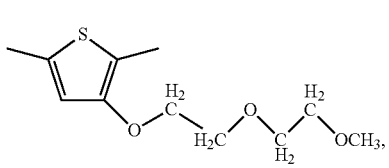

(XVIII)

or any combination thereof. In embodiments, the cation of the acrylic acid salt, the residue of the methacrylic acid salt, the residue of the salt of maleic acid, or the residue of the salt of the monoester of maleic acid is selected from $NH_4^+$, $Na^+$, $K^+$, primary organic ammonium, secondary organic ammonium, tertiary organic ammonium, and quaternary organic ammonium.

In embodiments, the modifier of the sparge composition of any of the first embodiments comprises, consists of, or consists essentially of a copolymer of acrylic acid and/or a salt of acrylic acid with ATBS. In embodiments, the cation of the salt of the acrylic acid is selected from $NH_4^+$, $Na^+$, $K^+$, primary organic ammonium, secondary organic ammonium, tertiary organic ammonium, and quaternary organic ammonium. In embodiments, the ATBS is an ATBS salt, wherein the cation is selected from $NH_4^+$, $Na^+$, $K^+$, primary organic ammonium, secondary organic ammonium, tertiary organic ammonium, and quaternary organic ammonium.

In embodiments, the modifier of the sparge composition of any of the first embodiments comprises, consists of, or consists essentially of a terpolymer of acrylic acid and/or a salt of acrylic acid, ATBS, and acrylamide. In embodiments, the cation of the salt of the acrylic acid is selected from $NH_4^+$, $Na^+$, $K^+$, primary organic ammonium, secondary organic ammonium, tertiary organic ammonium, and quaternary organic ammonium. In embodiments, the ATBS is an ATBS salt, wherein the cation is selected from $NH_4^+$, $Na^+$, $K^+$, primary organic ammonium, secondary organic ammonium, tertiary organic ammonium, and quaternary organic ammonium.

Seventh Embodiments

In seventh embodiments, there is provided a method comprising sparging the sparge composition of any one of the first to sixth embodiments to yield a froth comprising tailings of gangue and a sparged slurry comprising a concentrate of phosphate beneficiary; and separating at least a portion of the concentrate from the sparged slurry. In embodiments, the sparging the sparge composition yields a sparged composition, the sparged composition comprising, consisting of, or consisting essentially of an upper froth layer and a lower slurry layer. In some such embodiments, the lower slurry layer comprises water and a slurry of the concentrate and the upper froth layer comprises the tailings. In some such embodiments, the method comprises separating the upper froth layer from the lower slurry layer. Therefore the separating the at least the portion of concentrate from the tailings is accomplished by means known in the art. In embodiments, the separating comprises, consists of, or consists essentially of: tapping off at least a portion of the upper froth layer, skimming off at least a portion of the upper froth layer, depositing at least a portion of the upper froth layer onto a launder, decanting at least a portion of the upper froth layer, or any combination thereof.

Eighth Embodiments

In eighth embodiments, there is provided a method of froth flotation, the method comprising, consisting of, or consisting essentially of forming a sparge composition, the sparge composition comprising (i) a medium, (ii) a particulate comprising a mineral ore, the mineral ore comprising a beneficiary and a gangue, (iii) a collector, and (iv) a modifier comprising one or more sulfonated polymers; and sparging the sparge composition to yield a sparged composition, the sparged composition comprising, consisting of, or consisting essentially of a froth and a sparged slurry. In embodiments, the mineral ore comprises, consists of, or consists essentially of a phosphate ore, the phosphate ore comprising a gangue and a phosphate beneficiary, wherein the sparged slurry comprises a concentrate of the phosphate beneficiary. In embodiments, the method further comprises separating at least a portion of the concentrate of the phosphate beneficiary from the sparged composition. In some eighth embodiments, the froth comprises tailings of the gangue and the sparged slurry comprises the concentrate of the phosphate beneficiary, and the method comprises separating at least a portion of the concentrate of the phosphate beneficiary from the sparged slurry. In other eighth embodiments, the froth comprises a concentrate of the beneficiary and the sparged slurry comprises tailings of gangue, and the method comprises separating at least a portion of the concentrate from the sparged froth. In any of the eighth embodiments, the medium comprises, consists of, or consists essentially of water.

In embodiments, the gangue comprises, consists of, or consists essentially of a silicate, silica, carbonate, or any combination thereof. In embodiments, the gangue comprises, consists of, or consists essentially of calcite, dolomite, clay, or any combination thereof. In embodiments, the ore comprises, consists of, or consists essentially of a phosphate ore. In some such embodiments, the gangue comprises or consists essentially of silicate, silica, carbonate, or any combination thereof.

In embodiments the mineral ore comprises, consists of, or consists essentially of a fertilizer ore, a fuel mineral ore, or any combination thereof. In embodiments, the mineral ore comprises, consists of, or consists essentially of a fertilizer ore selected from phosphate ore, potash ore, and a combination thereof. In embodiments, the mineral ore comprises, consists of, or consists essentially of an industrial mineral ore selected from limestone, clay, sand, gravel, diatomite, kaolin, bentonite, silica, barite, gypsum, talc, zircon, fluorite, and any combination thereof. In embodiments, the mineral ore comprises, consists of, or consists essentially of a fuel mineral ore selected from coal, bituminous oil sands, and a combination thereof.

In embodiments, the mineral ore comprises phosphate ore and the gangue comprises calcite, dolomite, silica, a silicate, or any combination thereof.

In embodiments, the sparge composition of the method of the eighth embodiments further comprises phosphoric acid. In some such embodiments, the weight ratio of the phosphoric acid to the particulate comprising the mineral ore in the sparge composition of the method of the eighth embodiments is from about 0.5 kg to about 20 kg of phosphoric acid per ton of the particles of the mineral ore, in embodiments from about 0.5 kg to about 8 kg, in embodiments from about 1 kg to about 8 kg, in embodiments from about 1.5 kg to about 8 kg, in embodiments from about 1.5 kg to about 7 kg, in embodiments from about 1.5 kg to about 6 kg, in embodiments from about 1.5 kg to about 5 kg, in embodiments from about 1.5 kg to about 4 kg, or in embodiments from about 1.5 kg to about 3 kg of phosphoric acid per ton of the particulate comprising the mineral ore.

In embodiments the sparge composition further comprises a pH adjustment agent. In embodiments, the pH adjustment agent is an acid. In embodiments, the pH adjustment agent is a base. In embodiments, the acid is selected from hydrochloric acid, sulfuric acid, p-toluene sulfonic acid, and any combination thereof. In embodiments, the pH adjustment agent comprises, consists of, or consists essentially of sulfuric acid.

In embodiments the sparge composition further comprises a pH adjustment agent. In embodiments, the pH adjustment agent is an acid. In embodiments, the pH adjustment agent is a base. In embodiments, the acid is selected from hydrochloric acid, sulfuric acid, p-toluene sulfonic acid, and any combination thereof. In embodiments, the pH adjustment agent comprises, consists of, or consists essentially of sulfuric acid.

In embodiments, the sparge composition has a pH from 1-3, in embodiments 3-6, in embodiments 4-7, in embodiments 6-10, in embodiments 11-14, in embodiments 4.5 to 5.5, in embodiments, 4.7 to 5.3, or in embodiments 5.0 to 5.2.

In embodiments, the collector is selected from tall oils, sulfonated fatty acids, sulfonated tall oils, and any combination thereof. In some such embodiments, the collector comprises, consists of, or consists of a sulfonated fatty acid. In some such embodiments, the collector is selected from sulfonated oleic acid, sulfonated linoleic acid, sulfonated palmitic acid, sulfonated stearic acid, and any combination thereof. In embodiments, the collector comprises, consists of, or consists essentially of sulfonated oleic acid.

In embodiments, the sparge composition comprises, consists of, or consists essentially of: water; a particulate comprising a phosphate ore, the phosphate ore comprising a phosphate beneficiary and a gangue selected from calcite, dolomite, silica and/or silicate, and any combination thereof; sulfonated oleic acid; a modifier comprising one or more sulfonated polymers; and phosphoric acid, wherein the pH of the sparge composition is from about 4 to about 7.

In embodiments, the one or more sulfonated polymers is selected from a sulfonated natural polymer, a sulfonated synthetic polymer, and a combination thereof.

In embodiments the weight average molecular weight of the one or more sulfonated synthetic polymers is from about 300 to about 5,000,000, in embodiments about 300 to about 1,000,000, in embodiments about 300 to about 500,000, in embodiments about 300 to about 100,000, in embodiments about 300 to about 50,000, in embodiments about 300 to about 35,000, in embodiments about 300 to about 30,000, in embodiments about 300 to about 25,000, in embodiments from about 500 to about 5,000,000, in embodiments about 500 to about 1,000,000, in embodiments about 500 to about 500,000, in embodiments about 500 to about 100,000, in embodiments about 500 to about 50,000, in embodiments about 500 to about 25,000, in embodiments from about 700 to about 5,000,000, in embodiments about 700 to about 1,000,000, in embodiments about 700 to about 500,000, in embodiments about 700 to about 100,000, in embodiments about 700 to about 50,000, in embodiments about 700 to about 25,000, in embodiments from about 1,000 to about 5,000,000, in embodiments about 1,000 to about 1,000,000, in embodiments about 1,000 to about 500,000, in embodiments about 1,000 to about 100,000, in embodiments about 1,000 to about 50,000, in embodiments about 1,000 to about 40,000, in embodiments about 1,000 to about 35,000, in embodiments about 1,000 to about 30,000, in embodiments about 1,000 to about 25,000, in embodiments about 500 to about 20,000, in embodiments about 500 to about 15,000, in embodiments about 500 to about 10,000, in embodiments about 500 to about 7,000, in embodiments about 500 to about 5,000, in embodiments about 500 to about 3,000, in embodiments about 500 to about 1,000, in embodiments about 1,000 to about 25,000, in embodiments about 700 to about 20,000, in embodiments about 700 to about 15,000, in embodiments about 700 to about 10,000, in embodiments about 700 to about 7,000, in embodiments about 700 to about 5,000, in embodiments about 700 to about 3,000, in embodiments about 700 to about 1,000, in embodiments about 1,000 to about 25,000, in embodiments about 1,000 to about 20,000, in embodiments about 1,000 to about 15,000, in embodiments about 1,000 to about 10,000, in embodiments about 1,000 to about 7,000, in embodiments about 1,000 to about 5,000, in embodiments about 1,000 to about 3,000, or in embodiments about 1,000 to about 2,000.

In embodiments, the weight ratio of the one or more sulfonated polymers to the particulate comprising the mineral ore in the sparge composition of the method of the eighth embodiments is from about 1 g to about 1000 g of the one or more sulfonated polymers per ton of the particulate comprising the mineral ore, in embodiments from about 5 g to about 500 g, in embodiments, from about 10 g to about 500 g, in embodiments from about 20 g to about 300 g, in embodiments from about 50 g to about 300 g, in embodiments from about 50 g to about 200 g, in embodiments from about 10 g to about 100 g, in embodiments from about 10 g to about 70 g, or in embodiments from about 30 g to about 70 g of the one or more sulfonated polymers per ton of the particulate.

Ninth Embodiments

In ninth embodiments, the modifier of the composition of the method of the seventh or eighth embodiments comprises, consists of, or consists essentially of a sulfonated lignin. In embodiments, the sulfonated lignin has a weight average molecular weight range of from about 1,000 to about 140,000.

In embodiments, the sulfonated lignin comprises, consists of, or consists essentially of a byproduct of production of wood pulp using sulfite pumping. In some embodiments, the sulfonated lignin is the reaction product of lignin with one or more sulfites, one or more bisulfites, or a combination thereof.

In embodiments, the sulfonated lignin has comprises a modification of structure (I) wherein one or more of the —$CH_2OH$ groups is replaced with —$CH_2SO_3H$, —$CH_2SO_3^-$, or a combination thereof.

In embodiments, the sulfonated lignin has a structure comprising structure (II), structure (III), or both structure (II) and structure (III), wherein $R_1$ is hydrogen or one of a wide variety of organic structures found in the structure of lignin; $R_2$ is one of a wide variety of organic structures found in the structure of lignin; and $R_3$ is hydrogen or one of a wide variety of organic structures found in the structure of lignin.

Tenth Embodiments

In tenth embodiments, the modifier of the method of the seventh or eighth embodiments comprises, consists of, or consists essentially of a sulfonated starch. In embodiments, the sulfonated starch comprises amylopectin wherein one or more of the —OH groups is replaced with a sulfonate group (—$SO_3H$ and/or —$SO_3^-$), amylose wherein one or more of the —OH groups is replaced by a sulfonate group (—$SO_3H$ and/or —$SO_3^-$), or a combination thereof.

Eleventh Embodiments

In eleventh embodiments, the modifier of the method of the seventh or eighth embodiments comprises, consists of, or consists essentially of a sulfonated cellulose, wherein one or more of the —OH groups in cellulose molecules is replaced by a sulfonate group (—$SO_3H$ and/or —$SO_3^-$).

Twelfth Embodiments

In twelfth embodiments, the modifier of the method of the seventh or eighth embodiments comprises, consists of, or consists essentially of a sulfonated natural polymer selected from sulfonated lignin, sulfonated starch, sulfonated cellulose, sulfonated guar gum, sulfonated xanthate gum, and any combination thereof.

Thirteenth Embodiments

In thirteenth embodiments, the modifier of the method of the seventh or eighth embodiments comprises a sulfonated synthetic polymer. In thirteenth embodiments, the modifier of the sparge composition of the methods of the seventh or eighth embodiments comprises a sulfonated synthetic polymer comprising a residue of a sulfonated monomer, wherein the sulfonated monomer is selected from sulfonated vinyl alcohol, sulfonated acrylamide, sulfomethylated acrylamide, 2-acrylamido-2-methylpropane sulfonic acid and/or a salt thereof (ATBS), styrene sulfonic acid and/or a salt thereof, and any combination thereof.

In embodiments, the sulfonated synthetic polymer comprises a monomer residue selected from the monomer residue having the structure (IV), wherein the counterion is selected from $NH_4^+$, $Na^+$, $K^+$, primary organic ammonium, secondary organic ammonium, tertiary organic ammonium, and quaternary organic ammonium; the monomer residue having the structure (V), the monomer residue having the structure (VI), wherein the counterion is selected from $NH_4^+$, $Na^+$, $K^+$, primary organic ammonium, secondary organic ammonium, tertiary organic ammonium, and quaternary organic ammonium; the monomer residue having the structure (VII); the monomer residue having the structure (VIII), wherein the counterion is selected from $NH_4^+$, $Na^+$, $K^+$, primary organic ammonium, secondary organic ammonium, tertiary organic ammonium, and quaternary organic ammonium; the monomer residue having the structure (IX); the monomer residue having the structure (X); the monomer residue having the structure (XI), wherein the counterion is selected from $NH_4^+$, $Na^+$, $K^+$, primary organic ammonium, secondary organic ammonium, tertiary organic ammonium, and quaternary organic ammonium; the monomer residue having the structure (XII); the monomer residue having the structure (XIII), wherein the counterion is selected from $NH_4^+$, $Na^+$, $K^+$, primary organic ammonium, secondary organic ammonium, tertiary organic ammonium, and quaternary organic ammonium; the monomer residue having the structure (XIV), wherein $R_4$ is alkyl; the monomer residue having the structure (XV), wherein $R_4$ is alkyl and wherein the counterion is selected from $NH_4^+$, $Na^+$, $K^+$, primary organic ammonium, secondary organic ammonium, tertiary organic ammonium, and quaternary organic ammonium; the monomer residue having the structure (XVI); the monomer residue having the structure (XVII), wherein the counterion is selected from $NH_4^+$, $Na^+$, $K^+$, primary organic ammonium, secondary organic ammonium, tertiary organic ammonium, and quaternary organic ammonium; and any combination thereof.

In some such thirteenth embodiments, the sulfonated synthetic polymer further comprises the residue of acrylamide, the residue of acrylic acid, the residue of an acrylic acid salt, the residue of methacrylic acid, the residue of a methacrylic acid salt, the residue of maleic acid, the residue of a salt of maleic acid, the residue of a monoester of maleic acid, the residue of salt of a monoester of maleic acid, the residue of a diester of maleic acid, the residue having the structure (XVI), or any combination thereof. In embodiments, the cation of the acrylic acid salt, the residue of the methacrylic acid salt, the residue of the salt of maleic acid, or the residue of the salt of the monoester of maleic acid is selected from $NH_4^+$, $Na^+$, $K^+$, primary organic ammonium, secondary organic ammonium, tertiary organic ammonium, and quaternary organic ammonium.

In embodiments, the modifier of the sparge composition of any of the methods of the seventh or eighth embodiments comprises, consists of, or consists essentially of a copolymer of acrylic acid and/or a salt of acrylic acid with ATBS. In embodiments, the cation of the salt of the acrylic acid is selected from $NH_4^+$, $Na^+$, $K^+$, primary organic ammonium, secondary organic ammonium, tertiary organic ammonium, and quaternary organic ammonium. In embodiments, the ATBS is an ATBS salt, wherein the cation is selected from $NH_4^+$, $Na^+$, $K^+$, primary organic ammonium, secondary organic ammonium, tertiary organic ammonium, and quaternary organic ammonium.

In embodiments, the modifier of the sparge composition of any of the methods of the seventh or eighth embodiments comprises, consists of, or consists essentially of a terpolymer of acrylic acid and/or a salt of acrylic acid, ATBS, and acrylamide. In embodiments, the cation of the salt of the acrylic acid is selected from $NH_4^+$, $Na^+$, $K^+$, primary organic ammonium, secondary organic ammonium, tertiary organic ammonium, and quaternary organic ammonium. In embodiments, the ATBS is an ATBS salt, wherein the cation is selected from $NH_4^+$, $Na^+$, $K^+$, primary organic ammonium, secondary organic ammonium, tertiary organic ammonium, and quaternary organic ammonium.

In embodiments, at least one of the one or more sulfonated polymers of any one of the methods of the seventh or eighth embodiments comprises a residue of a monomer, wherein the monomer is selected from sulfonated vinyl alcohol, sulfonated acrylamide, sulfomethylated acrylamide, 2-acrylamido-2-methylpropane sulfonic acid and/or a salt thereof (ATBS), styrene sulfonic acid and/or a salt thereof, and any combination thereof. In some such embodiments, the at least one of the one or more sulfonated polymers further comprises a residue of a monomer selected from acrylic acid, methacrylic acid, acrylamide, vinyl alcohol, maleic acid, maleic acid esters, and any combination thereof. In some such embodiments, the at least one of the one or more sulfonated polymers comprises a residue of a monomer, wherein the monomer is acrylic acid. In some such embodiments, the at least one of the one or more sulfonated polymers comprises the residue of ATBS, the residue of a sulfomethylated acrylamide, or both the residue of ATBS and the residue of sulfomethylated acrylamide.

In embodiments, the modifier of any of the methods of the seventh and eighth embodiments comprises a naphthalene sulfonate formaldehyde condensate, sulfonated poly(thiophene-3-[2-(2-methoxyethoxy)ethoxy]-2,5-diyl), or a combination thereof.

Fourteenth Embodiments

In fourteenth embodiments, at least one of the one or more sulfonated polymers of any of the first to thirteenth embodiments is tagged with a fluorescent tag. In embodiments, the fluorescent tag is copolymerized into the backbone of the at least one of the one or more sulfonated polymers or the fluorescent tag is otherwise covalently bonded to the at least one of the one or more sulfonated polymers. In embodiments, the fluorescent tag is selected from the group consisting of hydroxy allyloxy propyl naphthalimide (HAPNQ), pyrene tetrasulfonic acid (PTSA), naphthalene disulfonic acid, and 4-methoxy-N-(3-dimethylaminopropyl)-naphthalimide vinylbenzyl chloride quat (VBNQ). In embodiments, the fluorescent tag is about 2% to about 5% by weight of the one or more sulfonated polymers.

In embodiments, the modifier of any of the first to thirteenth embodiments comprises a fluorescent tag material. In such embodiments, the ratio by weight of the fluorescent tag material to the one or more sulfonated polymers is from about 2:98 to about 5:95. In some such embodiments, the fluorescent tag material is selected from the group consisting of hydroxy allyloxy propyl naphthalimide (HAPNQ), pyrene tetrasulfonic acid (PTSA), naphthalene disulfonic acid, and VBNQ.

Fifteenth Embodiments

In fifteenth embodiments, the method of any one of the seventh to fourteenth embodiments further comprises grinding a raw mineral ore to form the phosphate ore. In embodiments, the grinding reduces the largest dimension of the raw mineral ore by a factor of 2 to a factor of $1 \times 10^9$.

Sixteenth Embodiments

In sixteenth embodiments, the method of the fifteenth embodiments further comprises the step of combining the phosphate ore with at least a portion of the medium to form a medium-ore slurry.

Seventeenth Embodiments

In seventeenth embodiments, the method of the sixteenth embodiments further comprises desliming the phosphate ore.

Eighteenth Embodiments

In eighteenth embodiments, the method of any one of the sixteenth or seventeenth embodiments further comprises combining the phosphate ore with at least a portion of the modifier, the collector, or the modifier and the collector to form a modifier/collector-ore slurry, and conditioning the phosphate ore.

Nineteenth Embodiments

In nineteenth embodiments, the method of the seventh to eighteenth embodiments comprises combining the particulate with the modifier, the collector, and the medium to make the sparge composition.

Twentieth Embodiments

In twentieth embodiments, there is provided a use of any of the sparge compositions of the first to sixth embodiments in the beneficiation of phosphate ore by reverse froth flotation to furnish a phosphate beneficiary for use in the manufacture of orthophosphoric acid.

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

EXAMPLES

Separation of a phosphate ore into a concentrate and tailings was conducted using a sulfonate polymer as modifier. The phosphate ore comprised francolite with calcite, dolomite, and silicate as gangue.

Example 1: Preparation of Phosphate Ore Samples

Two samples of a sedimentary phosphate ore were obtained from the flotation circuit in a phosphate flotation plant as follows: the feed containing an aqueous slurry of a comminuted deslimed ore for the conditioning tank of a phosphate flotation plant was tapped at three different times; on a first occasion to obtain pulp sample I, on a second occasion to obtain a pulp sample II, and on a third occasion to obtain pulp sample III. Pulp samples I, II, and III were each separately dried, and bagged to give ore samples I and II respectively.

Each of ore samples I and II was chemically analyzed for weight percent $P_2O_5$ equivalent, MgO equivalent, $SiO_2$ equivalent, and weight loss at 925° C. The particle distribution of each of ore samples I and II was analyzed. The results are given in TABLE 1:

TABLE 1

Particle size distribution (as measured throw-action sieve analysis carried out wet) and composition (as measured by X-ray fluorescence) of Ores I, II, and III

| Ore sample | Particle size distribution, % by weight | | | Composition, % | | | | % weight loss at 925° C. |
|---|---|---|---|---|---|---|---|---|
| | <38 μm | >38 μm <250 μm | >250 μm | $P_2O_5$ | MgO | CaO | $SiO_2$ | |
| Ore Sample I | 12.8 | 68.1 | 19.1 | 21.64 | 1.25 | 53.89 | 1.34 | 19.16 |
| Ore Sample II | 12.2 | 67.5 | 20.3 | 21.13 | 1.13 | 53.68 | 1.15 | 19.21 |
| Ore Sample III | 20.58 | 71.58 | 7.84 | 22.34 | 0.54 | 57.35 | 0.94 | 19.56 |

Example 2: Aqueous Polymers

Six aqueous polymers were synthesized as in Table 2:

TABLE 2

Aqueous polymers

| Aqueous Polymer | Composition | Actives, wt % | Weight average molecular weight, g/mole |
|---|---|---|---|
| A | Potassium polyacrylate | 29 | 25,000-30,000 |
| B | Sodium poly(sodium acrylate-co-methyl acrylate) | 30 | 25,000-30,000 |
| C | Poly(maleic acid) | 40 | 25,000-30,000 |
| D | Ammonium salt of poly(acrylic acid-co-ATBS sulfonic acid) | 34.5 | 5,000-10,000 |
| E | Sodium salt of poly(acrylic acid-co-sulfomethylated acrylamide) | 35 | 25,000-30,000 |
| F | Sodium salt of poly(acrylic acid-co-sulfomethylated acrylamide), tagged with less than 2% hydroxyl allyloxy propyl naphthalimide quaternary salt (HAPNQ) | 35 | 25,000-30,000 |

Example 3: First Set of Sparge Tests with Ore Sample I

Reverse flotation tests were conducted in a Denver D-12 Laboratory Flotation Machine. Sulfonated oleic acid was used as collector at a dosage of two kilograms per ton of ore, phosphoric acid was used as a depressant, one of the polymers listed in TABLE 2 was used as modifier, and sulfuric acid was used as pH adjustment agent. Each collector, depressant, and pH adjuster was prepared as a 10% solution in deionized water. For each test, a phosphate ore slurry was made by dispersing dried phosphate ore Sample I at 25% solids in tap water. The slurry was then conditioned by the addition of depressant, modifier and the collector in the amounts given in TABLE 3. The pH of the conditioned slurry was adjusted to 5.0-5.2 with sulfuric acid. Finally, the slurry was sparged with air. Calcite and dolomite were floated from the slurry and removed as tailings, while the phosphate ore concentrate remained in the slurry as concentrate. Both concentrate and tailings were filtered, dried, weighed, and analyzed for $P_2O_5$ content. The flotation test results are given in TABLE 3 and FIG. 1:

TABLE 3

First set of sparge tests with Ore Sample I in tap water

| | | | | | Concentrate | |
| --- | --- | --- | --- | --- | --- | --- |
| | | Modifier | | | Grade | |
| Test # | Depressant Phosphoric acid, kg/t | Aqueous Polymer | Aqueous Polymer, g/t | Yield, % | of $P_2O_5$, % | Recovery of $P_2O_5$, % |
| 1 | 1 | None | | 47.82 | 32.40 | 73.17 |
| 2 | 2 | None | | 52.29 | 32.32 | 77.97 |
| 3 | 1 | A | 150 | 56.09 | 31.20 | 84.02 |
| 4 | 1 | B | 150 | 59.37 | 30.00 | 84.75 |
| 5 | 1 | C | 150 | 46.58 | 33.07 | 73.54 |
| 6 | 1 | D | 150 | 54.62 | 32.72 | 83.31 |
| 7 | 1 | E | 150 | 53.63 | 33.05 | 82.25 |
| 8 | 1 | F | 150 | 53.35 | 33.30 | 82.91 | kg/t: kilogram per ton of dry ore;
g/t: gram per ton of dry ore

FIG. 1 shows a plot of % grade versus % recovery. As shown in TABLE 3 and FIG. 1, addition of the sulfonated polymers D, E, and F significantly improved both phosphate grade and recovery. Non-sulfonated Polymers A and B improved phosphate recovery but lowered phosphate grade. Polymer C (without sulfonate group) showed an improved phosphate grade but lower phosphate recovery. Furthermore, usage of depressant phosphoric acid can be significantly reduced while the phosphate ($P_2O5$) recovery is increased.

Example 4: Second Set of Sparge Tests with Ore Sample I

In Example 4, Polymers D and E were tested with ore sample I in tap water. Example 4 was carried out in the same way as Example 3, except that the amounts of the depressant (phosphoric acid) and modifier (polymer) were varied from test to test, as shown in TABLE 4. The flotation test results are given in TABLE 4 and FIG. 2.

TABLE 4

Second Set of Sparge Tests with Ore Sample I in Tap Water

| | | | | | Concentrate | |
| --- | --- | --- | --- | --- | --- | --- |
| | | Modifier | | | Grade | |
| Test # | Depressant Phosphoric acid, kg/t | Aqueous Polymer | Aqueous Polymer, g/t | Yield, % | of $P_2O_5$, % | Recovery of $P_2O_5$, % |
| 9 | 1.5 | None | | 49.16 | 32.36 | 75.75 |
| 10 | 2 | None | | 52.35 | 32.22 | 77.87 |
| 11 | 3 | None | | 53.84 | 32.15 | 80.96 |
| 12 | 4 | None | | 54.31 | 32.29 | 82.76 |
| 13 | 1.5 | D | 50 | 53.77 | 32.7 | 82.85 |

TABLE 4-continued

Second Set of Sparge Tests with Ore Sample I in Tap Water

| | | | | | Concentrate | |
| --- | --- | --- | --- | --- | --- | --- |
| | | Modifier | | | Grade | |
| Test # | Depressant Phosphoric acid, kg/t | Aqueous Polymer | Aqueous Polymer, g/t | Yield, % | of $P_2O_5$, % | Recovery of $P_2O_5$, % |
| 14 | 1.5 | D | 100 | 55.09 | 32.43 | 84.68 |
| 15 | 1.5 | D | 150 | 56.04 | 32.2 | 84.74 |
| 16 | 2 | D | 150 | 56.69 | 32.35 | 86.41 |
| 17 | 3 | D | 150 | 57.96 | 32.24 | 87.17 |
| 18 | 4 | D | 150 | 58.46 | 32.25 | 88.22 |
| 19 | 1.5 | E | 50 | 53.94 | 32.82 | 83.7 |
| 20 | 1.5 | E | 100 | 53.74 | 33.26 | 83.73 |
| 21 | 1.5 | E | 150 | 55.17 | 32.86 | 85.54 |
| 22 | 2 | E | 150 | 55.79 | 32.91 | 86.49 |
| 23 | 3 | E | 150 | 57.18 | 32.55 | 87.75 |
| 24 | 4 | E | 150 | 57.74 | 32.34 | 87.83 | kg/t: kilogram per ton of dry ore;
g/t: gram per ton of dry ore

Figure 2:
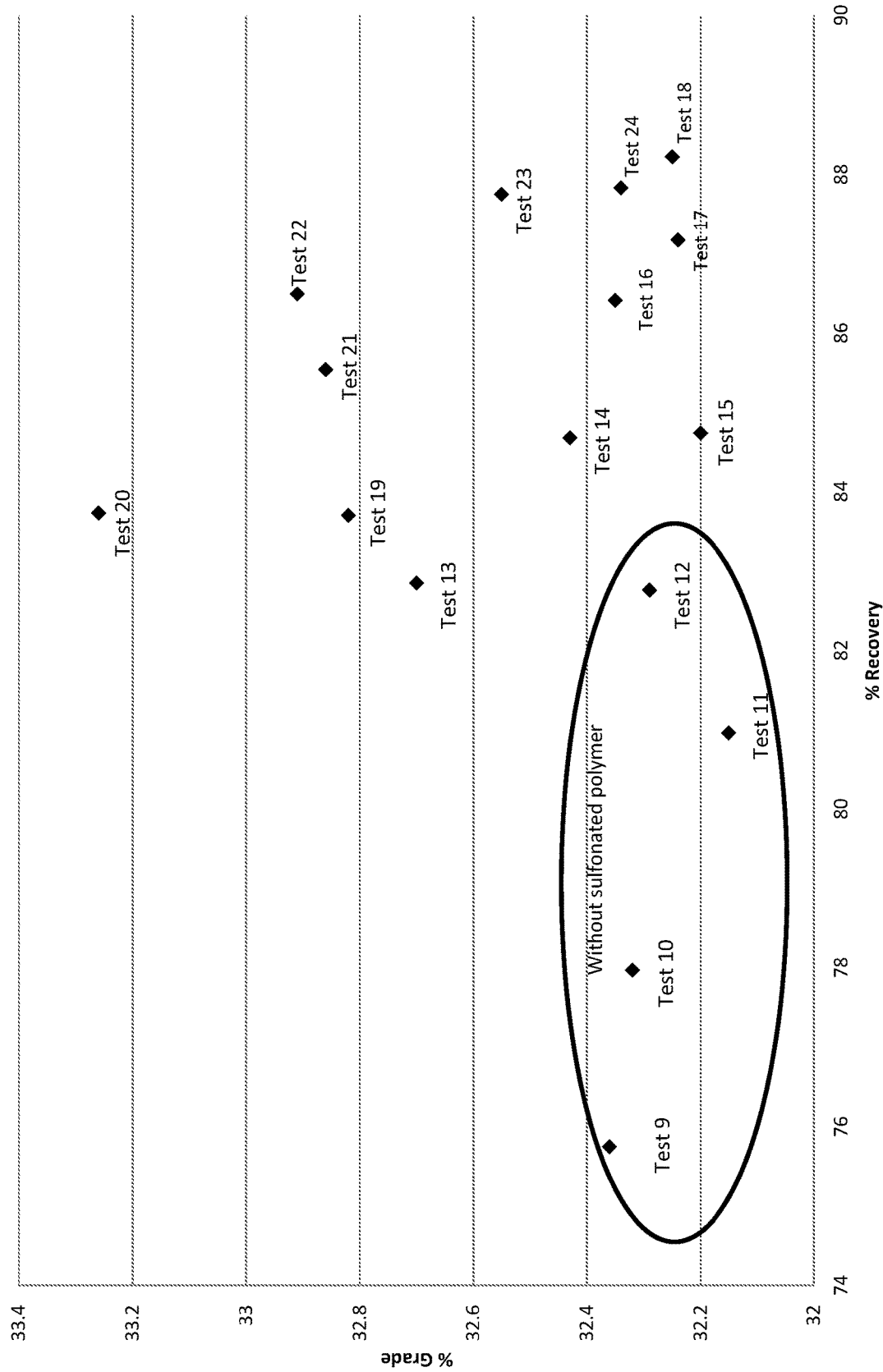
FIG. 2 shows a plot of the percentage grade of phosphate recovered versus % phosphate recovery for a further variety of froth flotation tests varying quantities of depressants.

As shown in TABLE 4 and FIG. 2, addition of either sulfonated polymer D or sulfonated polymer E significantly increased the phosphate recovery, while the corresponding phosphate grade was marginally changed or improved.

Example 5: Sparge Tests of Ore Sample II in Synthetic Process Water

Flotation tests on sulfonated Polymer F were conducted with ore sample II in a synthetic water, but otherwise in the same manner as Examples 3 and 4.

The synthetic water contained various ions to simulate the composition of a process water from the flotation plant (320 mg/l $Ca^{2+}$, 87 mg/l $Mg^{2+}$, 740 mg/l $Na^+$, 34 mg/l $K^+$, 900 mg/l $Cl^-$, 1400 mg/l $SO_4^{2-}$). The flotation test results are given in TABLE 5 and FIG. 3.

TABLE 5

Sparge Tests with Ore Sample II in Synthetic Simulated Process Water

| | | | | | Concentrate | |
| --- | --- | --- | --- | --- | --- | --- |
| | | Modifier | | | Grade | |
| Test # | Depressant Phosphoric acid, kg/t | Aqueous Polymer | Aqueous Polymer, g/t | Yield, % | of $P_2O_5$, % | Recovery of $P_2O_5$, % |
| 25 | 2 | None | | 50.75 | 33.57 | 80.40 |
| 26 | 3 | None | | 53.41 | 33.21 | 82.64 |
| 27 | 4 | None | | 54.65 | 33.24 | 84.84 |
| 28 | 6 | None | | 56.69 | 33.18 | 88.07 |
| 29 | 2 | F | 100 | 55.88 | 33.16 | 87.15 |
| 30 | 3 | F | 100 | 56.52 | 33.54 | 88.23 |
| 31 | 4 | F | 100 | 56.82 | 33.10 | 88.03 |
| 32 | 6 | F | 100 | 57.76 | 33.26 | 89.05 |
| 33 | 2 | F | 200 | 55.62 | 33.38 | 87.83 |
| 34 | 3 | F | 200 | 56.31 | 33.80 | 88.22 |
| 35 | 4 | F | 200 | 56.32 | 33.57 | 87.60 |
| 36 | 6 | F | 200 | 57.52 | 33.54 | 89.60 | kg/t: kilogram per ton of dry ore;
g/t: gram per ton of dry ore

Figure 3:
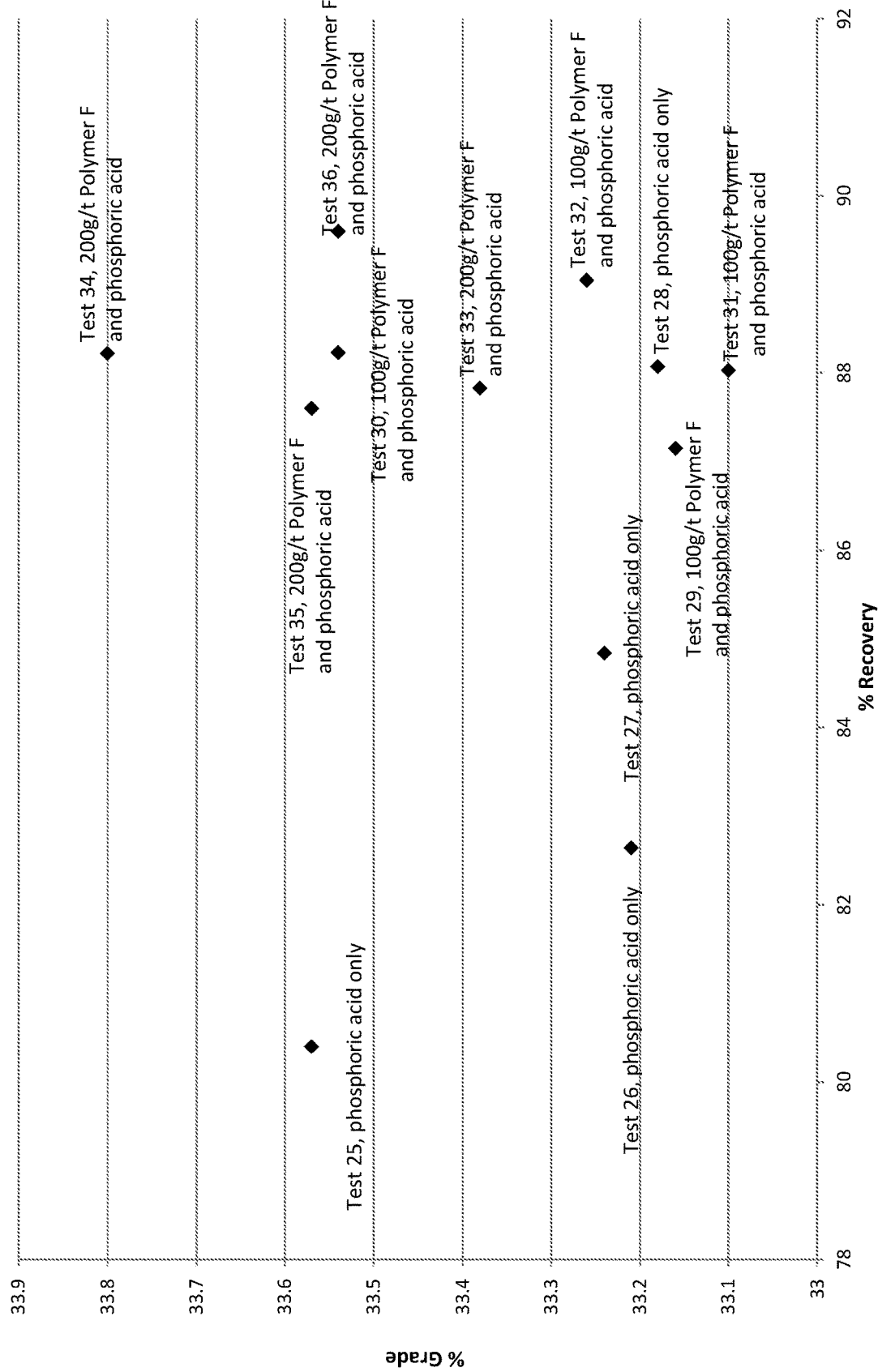
FIG. 3 shows a plot of the percentage grade of phosphate recovered versus % phosphate recovery for a variety of froth flotation tests in a synthetic water source.

As shown in TABLE 5 and FIG. 3, the addition of sulfonated polymer F significantly increased the phosphate recovery, while phosphate grade was marginally changed or improved. The improvement in phosphate recovery with the addition of polymer F was particularly significant at lower dosages of phosphoric acid. At 2 kg/t dosage of phosphoric acid, for example, the phosphate recovery increased from 80.4% to 87.15% with addition of 100 g/t of the aqueous sulfonated polymer solution. Furthermore, usage of phosphoric acid as depressant can be significantly reduced while simultaneously increasing phosphate recovery.

Example 6: Sparge Tests of Ore Sample III in Synthetic Process Water

Figure 4:
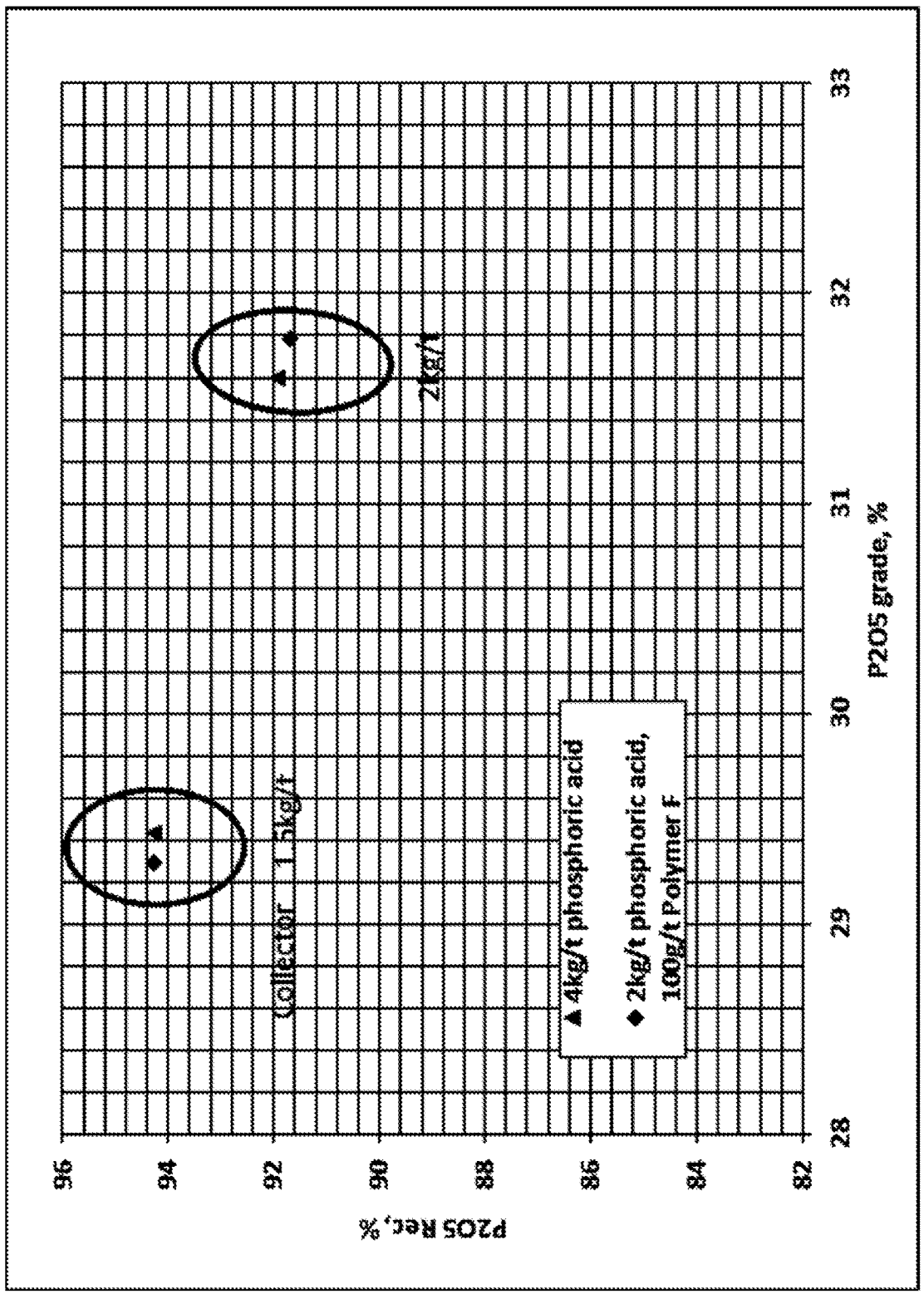
FIG. 4 shows a plot of percentage grade of phosphate recovered versus % phosphate recovery for several froth flotation tests at pH 4.2-4.6.

Flotation tests on sulfonated polymer F were conducted with ore sample III in a synthetic water at pH 4.2-4.6 at two collector dosages. The collector was sulfonated oleic acid. The flotation test results are given in TABLE 6 and FIG. 4. The results showed that polymer F could reduce the required dosage of phosphoric acid by 50% while maintaining a similar $P_2O_5$ grade and recovery of concentrate.

TABLE 6

Sparge Tests with Ore Sample III in Synthetic Simulated Process Water at pH 4.2-4.6

| | Depressant | Modifier | | | Concentrate | | |
| --- | --- | --- | --- | --- | --- | --- | --- |
| Test # | Phosphoric acid, kg/t | Aqueous Polymer | Aqueous Polymer g/t | Collector kg/t | Yield, % | Grade of $P_2O_5$, % | Recovery of $P_2O_5$, % |
| 37 | 4 | F | 0 | 1.5 | 70.76 | 29.43 | 94.27 |
| 38 | 4 | F | 0 | 2 | 64.88 | 31.60 | 91.92 |
| 39 | 2 | F | 100 | 1.5 | 70.86 | 29.29 | 94.28 |
| 40 | 2 | F | 100 | 2 | 64.28 | 31.78 | 91.70 | kg/t: kilogram per ton of dry ore;
g/t: gram per ton of dry ore

Example 7: Sparge Tests of Ore Sample III in Synthetic Process Water

Figure 5:
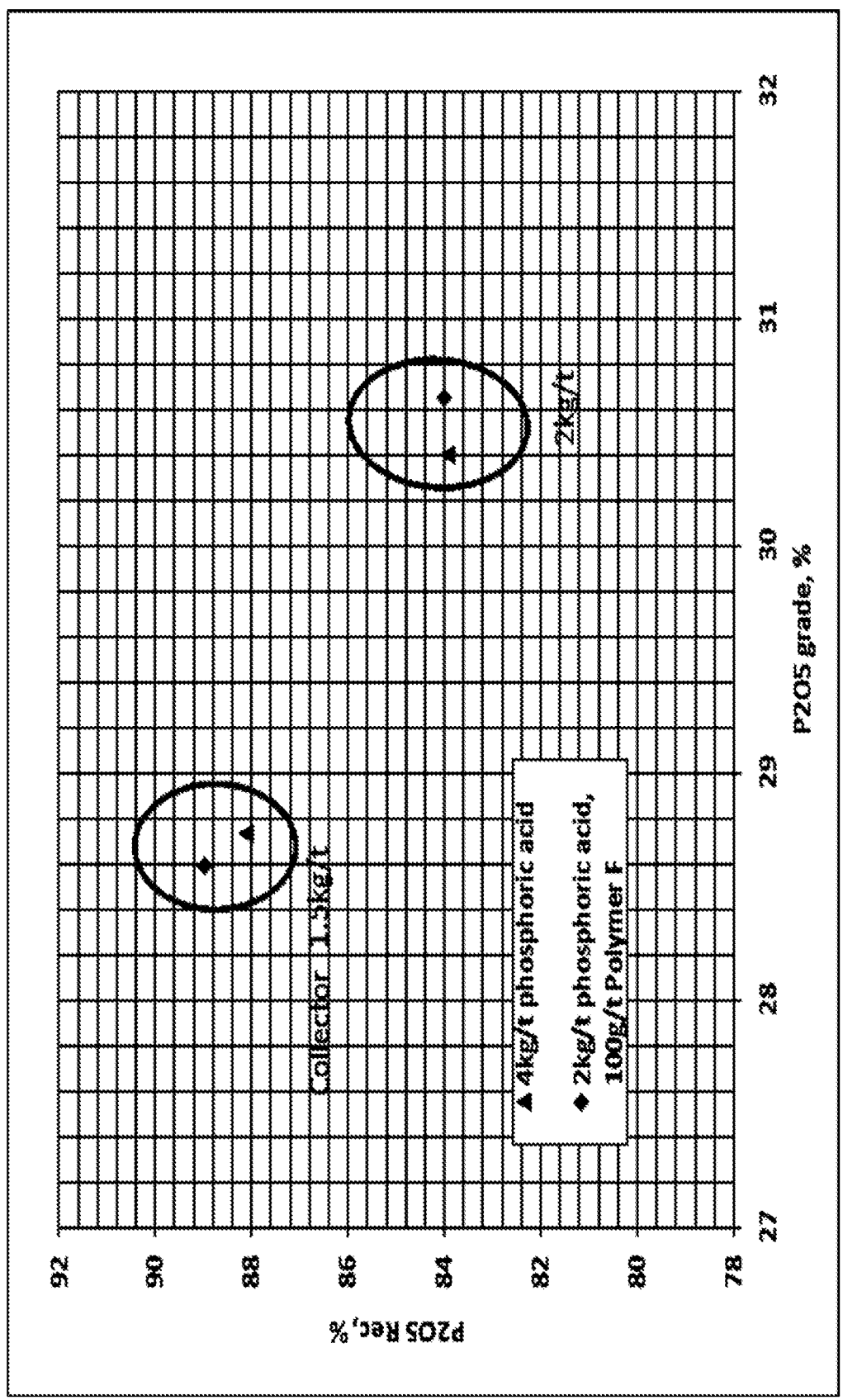
FIG. 5 shows a plot of percentage grade of phosphate recovered versus % phosphate recovery for several froth flotation tests at pH 6.5-7.

Flotation tests on sulfonated Polymer F were conducted with ore sample III in a synthetic water at pH 6.5-7, two collector dosages. The collector was sulfonated oleic acid. The flotation test results are given in TABLE 7 and FIG. 5. The results showed that polymer F could reduce the required dosage of phosphoric acid by 50% while maintaining a similar $P_2O_5$ grade and recovery of concentrate.

TABLE 7

Sparge Tests with Ore Sample III in Synthetic Simulated Process Water at pH 6.5-7.

| | Depressant | Modifier | | | Concentrate | | |
| --- | --- | --- | --- | --- | --- | --- | --- |
| Test # | Phosphoric acid, kg/t | Aqueous Polymer | Aqueous Polymer g/t | Collector kg/t | Yield, % | Grade of $P_2O_5$, % | Recovery of $P_2O_5$, % |
| 41 | 4 | F | 0 | 1.5 | 65.79 | 28.73 | 88.12 |
| 42 | 4 | F | 0 | 2 | 59.89 | 30.40 | 83.91 |
| 43 | 2 | F | 100 | 1.5 | 67.33 | 28.59 | 88.99 |
| 44 | 2 | F | 100 | 2 | 59.44 | 30.65 | 84.01 | kg/t: kilogram per ton of dry ore;
g/t: gram per ton of dry ore

What is claimed is:

1. A sparge composition comprising:
   (i) a medium;
   (ii) a phosphate ore comprising a phosphate beneficiary and a gangue;
   (iii) a collector comprising a sulfonated fatty acid; and
   (iv) a modifier comprising one or more sulfonated polymers, wherein at least one of the one or more sulfonated polymers comprises a monomer residue having the structure
   (a) VI

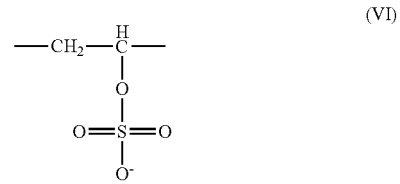

wherein the counterion is selected from $NH_4^+$, $Na^+$, $K^+$, primary organic ammonium, secondary organic ammonium, tertiary organic ammonium, and quaternary organic ammonium, (b) VII

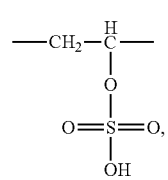
(VII)

c) VIII

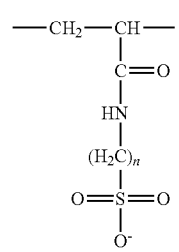
(VIII)

wherein n is 1, 2, or 3 and the counterion is selected from $NH_4^+$, $Na^+$, $K^+$, primary organic ammonium, secondary organic ammonium, tertiary organic ammonium, and quaternary organic ammonium, (d) IX

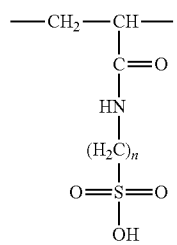
(IX)

wherein n is 1, 2, or 3, (e) XII

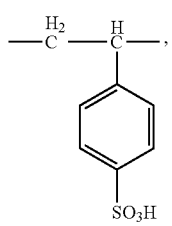
(XII)

(f) XIII

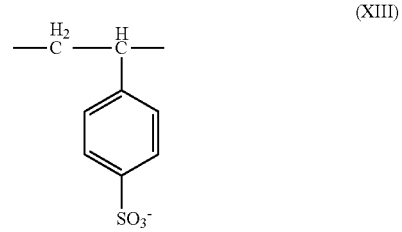
(XIII)

wherein the counterion is selected from $NH_4^+$, $Na^+$, $K^+$, primary organic ammonium, secondary organic ammonium, tertiary organic ammonium, and quaternary organic ammonium, (g) XIV

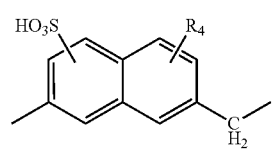
(XIV)

wherein $R_4$ is alkyl, (h) XV

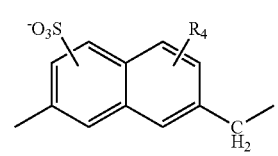
(XV)

wherein $R_4$ is alkyl and wherein the counterion is selected from $NH_4^+$, $Na^+$, $K^+$, primary organic ammonium, secondary organic ammonium, tertiary organic ammonium, and quaternary organic ammonium, (i) XVI

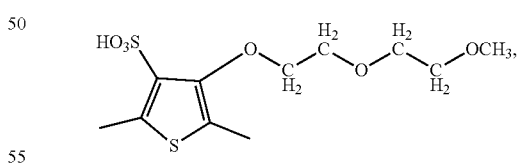
(XVI)

(j) XVII

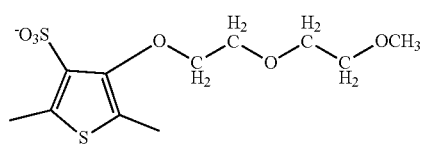
(XVII)

wherein the counterion is selected from $NH_4^+$, $Na^+$, $K^+$, primary organic ammonium, secondary organic ammonium, tertiary organic ammonium, and quaternary organic ammonium, or (k) any combination thereof wherein the phosphate beneficiary comprises a phosphate.

2. The sparge composition of claim 1, wherein the gangue comprises a silicate, silica, a carbonate, or any combination thereof.

3. The sparge composition of claim 1, wherein the modifier further comprises a sulfonated natural polymer.

4. The sparge composition of claim 1, wherein the modifier comprises a sulfonated lignin, a sulfonated starch, a sulfonated cellulose, a sulfonated guar gum, a sulfonated xanthan gum, or any combination thereof.

5. The sparge composition of claim 1, wherein the at least one of the one or more sulfonated polymers has a weight average molecular weight of from about 300 g/mole to about 100,000 g/mole.

6. The sparge composition of claim 5, wherein the at least one of the one or more sulfonated polymers further comprises a residue of acrylic acid, methacrylic acid, acrylamide, vinyl alcohol, maleic acid, a maleic acid ester, or any combination thereof.

7. The sparge composition of claim 1, wherein the phosphate beneficiary comprises an apatite.

8. The sparge composition of claim 7, wherein the apatite comprises a fluoroapatite.

9. The sparge composition of claim 1, the sparge composition further comprising phosphoric acid, wherein the collector is selected from sulfonated oleic acid, sulfonated linoleic acid, sulfonated palmitic acid, sulfonated stearic acid, and any combination thereof.

10. The sparge composition of claim 1, the sparge composition further comprising a pH adjusting agent, wherein the pH of the sparge composition further comprising the pH adjusting agent is from about 4 to about 7.

* * * * *